United States Patent
Khaneghah

(10) Patent No.: US 9,613,312 B2
(45) Date of Patent: Apr. 4, 2017

(54) PMAMUT: RUNTIME FLEXIBLE RESOURCE MANAGEMENT FRAMEWORK IN SCALABLE DISTRIBUTED SYSTEM BASED ON NATURE OF REQUEST, DEMAND AND SUPPLY AND FEDERALISM

(71) Applicant: Ehsan Mousavi Khaneghah, Tehran (IR)

(72) Inventor: Ehsan Mousavi Khaneghah, Tehran (IR)

( * ) Notice: Subject to any disclaimer, the term of this patent is extended or adjusted under 35 U.S.C. 154(b) by 7 days.

(21) Appl. No.: 14/489,472

(22) Filed: Sep. 18, 2014

(65) Prior Publication Data

US 2016/0085586 A1   Mar. 24, 2016

(51) Int. Cl.
*G06F 9/54* (2006.01)
*G06N 5/02* (2006.01)

(52) U.S. Cl.
CPC .................... *G06N 5/025* (2013.01)

(58) Field of Classification Search
CPC ...... G06F 9/5011; G06F 9/4881; G06N 5/025
See application file for complete search history.

(56) References Cited

U.S. PATENT DOCUMENTS

2014/0082072 A1* 3/2014 Kass ................ G06F 17/30867
709/204

OTHER PUBLICATIONS

Nathan A. Minami, A systems approach to risk management, Nov. 2008, pp. 1-7.*

* cited by examiner

*Primary Examiner* — Syed Roni
(74) *Attorney, Agent, or Firm* — Azadeh Saidi

(57) ABSTRACT

A system for management of resources with high scalability in geographical and management, having high variety of resources defined in the system, with high number of existing resources; wherein the system resolves the problems that have dynamic and interactive nature, and considers the concept of environment-system necessary for them; having complex decision-making capability in the field of resource management. Several patterns have been presented in the field of resource management with supporting of mentioned characteristics.

28 Claims, 6 Drawing Sheets

PMAMUT: RUNTIME FLEXIBLE RESOURCE MANAGEMENT FRAMEWORK IN SCALABLE DISTRIBUTED SYSTEM BASED ON NATURE OF REQUEST, DEMAND AND SUPPLY AND FEDERALISM

BRIEF SUMMARY OF THE INVENTION

This description of invention has been defined PMamut as a framework for flexible management of various kinds of resources in the distributed system. PMamut in this management framework, redefine the resource management element based on the extended of Organization and System Theories. PMamut introduce a new cognitive pattern and task assignment in the system based on extending reductionist thinking and system thinking. PMamut presents a two level resource management structure by separating two concepts of decision and enforcement in managing resources and extended theory based on the supply-demand theory for introducing a new concept named "Supplied-state" that have flexibility in changing management rules.

On the other hand, resource management element in PMamut makes distributed response structure based on the new concept named global activity without using centralized controlling machines (server). The resource management in PMamut, against other resource management patterns that force the element of the system to follow the rules of itself based on their response structure, introduce a new concept named "federalism" in distributed systems to protect autonomy of the elements of the system. In addition, it use concept of Leader machine to implement the extended theory of supply-demand based on the marketing economic in managing resources and forming response structure.

The management structure in PMamut is request oriented and manages requests based on the new structure named DNA PMamut that this structure is created per any request. DNA PMamut structure gives this opportunity to user or process that faces a single specific (integrated) structure in responding the requests. In addition, Resource management in PMamut by using DNA PMamut Structure and presenting a new concept name "Deputy" increasing the flexibility of the system in responding to requests with dynamic and interactive nature.

DETAILED DESCRIPTION OF THE INVENTION

Figure 1:
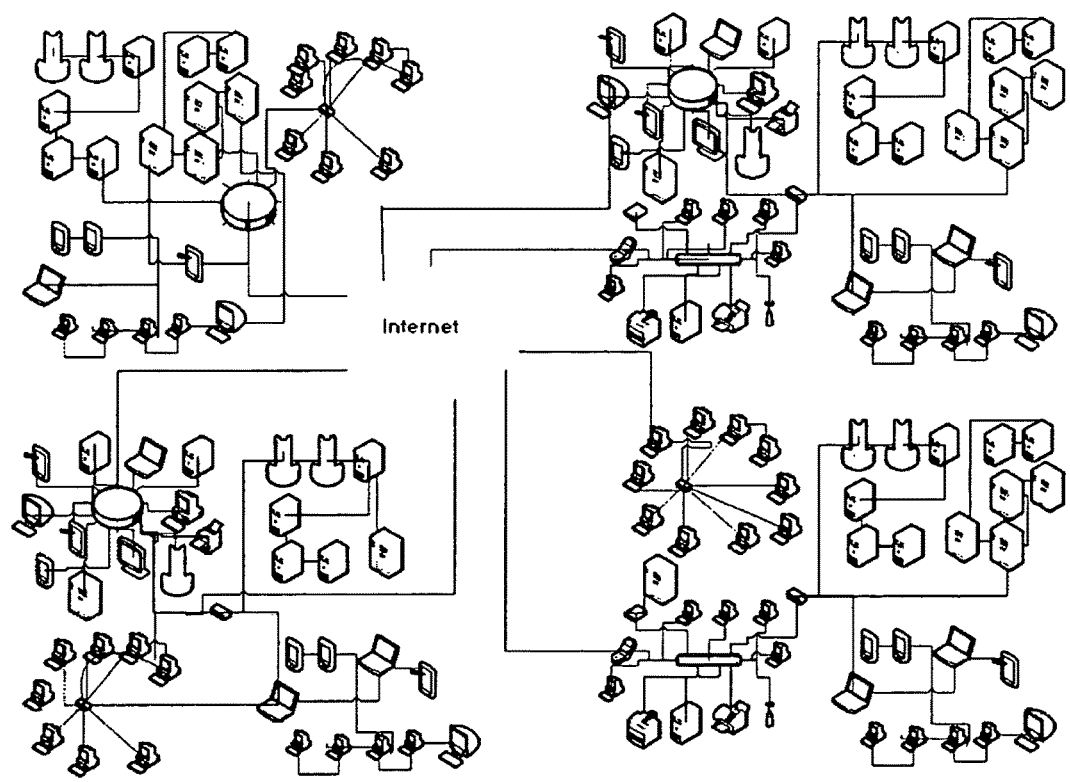
FIG. 1, displays the peer to peer system of the invention (global network) before occurrence of PBang X.

Basic Description of the Fundamentals of the Invention

Resource management is primarily defined within the purview of the system, and thus its design principles are dependent on theories used in designing of the system. On the other hand, resource management element should have good knowledge and understanding of the system's formative elements based on the suitable cognitive pattern, and thus be able to assign their tasks in line with the system's final goal. Here we will discuss the concept of system, cognitive patterns within a system, theories of system design, and the concept of a resource management element. Definition of a System:

System is a set or collection of elements which interact and collaborate to secure one or several final goal(s). Without getting into formalities of defining concepts such as "final goal", it should be obvious to us that this "final goal" or "vision" delineates a system and defines its boundaries. A system's boundaries are expressive of the type of problem which can be handled by the system and, in more inclusive terms; express the purview within which the system is defined. Another important concept related to a system is its mission. A system's mission demonstrates how elements within the system interact and co-operate to secure the final aim, or the "vision", of the system. It is sometimes referred to in the literature as "system structure" or "system arrangement", or as "systemic interaction".

Different Aspects of Theories:

One important challenge faced by scientists and philosophers alike is describing natural phenomena and subsequently compiling the laws which govern them. Man has always sought ways to understand what has been occurring around him and to thus compile laws which govern nature. There are two approaches to compiling these laws. One, which is adopted under the name of "Reductionism Theory", tries to arrive at the knowledge of a system by describing its constituting elements. Elements of a system are viewed as individual, separate entities by proponents of this approach. The other approach, coined "System Thinking Theory", seeks to describe inter-relations and interactions among elements of a system; interactions and inter-relations which orient the system towards its existential cause. Proponents of this approach maintain that behavior of a system is independent of particulars of its constituting elements (in other words a system and its constituting elements can't be treated as separate concepts).

Resource Management System:

A system's vision and its mission are totally dependent to the nature of system and are determined by the designer of the system. Hence it wouldn't be acceptable to try to study the concept of a "resource management element" without defining "system" first. It should be noted that activities of the resource management element should always be in line with the system's vision and based on patterns of interaction and inter-relation defined by the mission of the system.

And organizational theory stressed the technical requirements of the work activities going on in the systems. Systems theory provides an analytical framework for viewing a system in general. "Organization Theories" and "System Theories" can be used to establish a system (to define its vision and mission), Organization Theories, also called Machine Theories, lay their emphasis mostly on the two concepts of "control" and "prediction". And organizational theory stressed the technical requirements of the work activities going on in the systems. However, System Theory focuses on the two concepts of "description" and "explanation". Systems theory provides an analytical framework for viewing a system in general.

Resource Management Definition:

Resource management on systemic level means deploying and controlling resources through the existing processes of the system and creating response mechanisms within the system to respond to requests for the use of resources. A resource is defined as any element within the system which can satisfy the needs of other elements as they fulfill some activity (activities), thus maintaining the continuation of that activity. If we look at the tasks defined for system resource management, we would observe that "responding" in general and what is termed as "response structure" are part and parcel of resource management. On the other hand, dispensing and withdrawing resources to and from the requesting entities based on the general policy of the system is among the tasks of the resource manager.

"Resource management" is an element of the system and is thus totally bond by system policies. These policies are themselves a reflection of the system's vision and mission. As an element of the system, resource management should act in line with the final aim of the system. Hence, its two main tasks of responding to requests within the system (forming response structure) and controlling resources should be discharged in accordance with the final goals pursued by the system.

A system's vision is a concept which deals with the final goal of a system. It is about needs and necessities in response to which the system has been formed. General policies pursued by resource management of a system are thus a function of the system's vision. It is the vision of the system that determines the general approach adopted by the resource management in constructing a response structure and resource control. The very definition of resource for a particular system is a function of that system's vision, and requests in turn are defined by vision. Obviously, the only requests which are eligible to be granted are those which are in line with the final goal of the system.

A system's mission defines that system's formative elements and the relationships among them and the way they function in a coordinated manner to secure the system's final goal. This is what should determine a system's structure of responding to requests and controlling of resources; it determines the orientation of interactions and manner of execution of processes within the system. Location of resources during system activity is part and parcel of execution of processes. Policies adopted by resource management are thus determined by system's mission. Besides, a system's mission determines how the requesting element relates to the resource; thus defining policies and executive mechanisms of the response structure.

Considering the above discussion, it is clear that resource management is a function of a system's vision and its mission; and these two factors determine the manner in which a system's response structure is established and run. These factors also determine the position of "resource" in system activities, while they define the main concept dealt with by resource management, namely the resource itself.

Supply and Demand:

Supply and demand is a theory of the world of economy which has, as reasonably expected, the highest application in economy. Market economies work based on this theory and in fact the supply-demand model has originally been compiled for market economies. in such economies, individual buyers or sellers can't alter the market perceptibly and "price" is in fact a type of data. The supply rule states that other conditions being fixed, supply is a function of price and will be higher when price is higher and lower when price is lower.

The demand rule states that demand is a reverse function of price in a way that it will be higher at lower prices and lower when the price is high. Supply is in fact the flow of goods and services to the market aimed at meeting demand.

In a competitive market, supply and demand determine equilibrium price and equilibrium stock of a particular merchandise. Equilibrium price of a merchandise is the price of that merchandise when the supply during a fixed period is exactly enough for meeting the demand of that period. if the price goes higher than the equilibrium price then the demand falls and there will be a surplus and this will push the price down. If, on the other hand, the price is lower than the equilibrium price then there will be more demand which can't be met by existing supplies and the resulting dearth will push the price up, until the price reaches the equilibrium level. At equilibrium state there is a tendency of the prices to remain stable.

Problem Statement:

Here we will investigate the challenges faced by modern resource management. First of all we will discuss challenges and restraints created by adherence to organization theories and reductionist pattern of identification and distribution of tasks. Then we will deal with root causes of these challenges and their outward appearance in the real world.

Challenges of Using Reductionism Theory in Todays Resource Management: According to traditionally accepted theories, resource management is defined as the set of tasks aimed at dispensing resources to entities which need them at the time when the need is there. If we choose to use organization theory as the basis for describing resource management (this is a theory used for establishing management structure in modern systems), we will arrive at the following definition: resource management element is an element of the system which has the capability to predicts requests by other elements of the system for resources and the capability to control dispending of resources to the requesting elements.

As viewed by organization theory, prediction means implementing the necessary structure for responding to requests which may appear within the system. Resource management should be able to identify resources and should have access to them and should have the means to respond to requests as they appear within the system.

Complexity of Using Reductionism Theory for Resource Specifying

To implement the needed response structure, resource management has to collect data on resources within the system and to compile patterns of implementing the structure needed for dispensing to the elements in need. Resource management element has to know about particulars of each resource and its limitations in answering the needs of the requesting elements. Only then it will be able to allocate resources in a wise manner. It means that resource management element has to apply reductionism in the identification of the element "resource" using reductionism for identification of the element resource by resource management means that the latter gets involved in separation and later identification of resources based on their specification.

In other words resource management element has to break up each resource element within the system into its constituting components (a component will be the smallest unit used by the resource management for managing the resources), and then determine, based on these components, capacities and limitations of each resource element for meeting a certain request.

Using reductionism, the resource management element will be able to fulfill the task of establishing within the system the structure for responding to request and controlling the resources based on specifications and limitations of units which comprise resources. In fact the resource management element needs to have a specific mechanism of generating predictions and executing controls for each unit of a resource.

Complexity of Reductionism Theory for designing Resource Management

When a system is designed based on organization theory, the resource management element would also be designed based on this theory. The two main tasks cited for resource management element, namely responding to requests and controlling resources, are generalized tasks. I system designed based on organization theory, identification of each element within the system is based is based on reductionism.

Hence identification of resource management element and its tasks should be based on reductionism in such a system. If we want to use reductionism to define resource management element and its tasks, we will have to separate the resource management element into units. These units are firstly executors of the smallest indivisible tasks done by the resource management element and secondly are compiled based on reductionism pattern. Each unit is thus defined in an abstract way. Using reductionism pattern of identification and assignment of tasks in a system designed based on organization pattern will add to intricacy in the identification of resource and design of the resource management element.

Challenges of Relation Between Elements of Resource Management Designed Based on Reductionism Theory To fulfill its two essential tasks, namely creation of a response structure and controlling of resource, management element has to design a variety of mechanisms based on specifications and functioning of each of comprising units of each resource.

The most important factor in creation of such a challenge can be recognized in systems which are established based on organization theory. When a system is designed based on organization theory its resource management element is designed based on reductionism. This mean that the resource management element is separated into a number of units in a way that each unit takes up a part of the duties of the resource management.

The most important factor in separating resource management elements into units is the pattern used for such separation. Normally, there are two methods for such separation. Resource management element is divided into a number of fundamental units in this pattern, in a way that each unit takes on one of the tasks assigned to the resource management. Another pattern involves the division of the resource management element based on the nature of its relationship with resources within the system. In this method, the main focus is on those types of resource which are accessible within the system; and division of the resource management element into units is done based on the type of management needed for these resources.

In short, in the first method, division of the resource management into units is done based on the tasks defined for the resource management, while in the second division is done based on the resources themselves.

Normally, in today's systems which are designed based on Organization Theory, a combination of both methods (with a little more emphasis on the first) is used for division of the resource management element into units. Without getting into details of the division, it can be stated that the division is not a type of separation and the constituent units of the resource management element keep communicating and interacting with one another. Meanwhile, what is sought in Reductionism is division of the resource management element into units in a way that each unit can be treated as an abstract and separate entity.

While we seek in Reductionism division of the resource management element into separate units, we maintain that these units will not become abstract, separate parcels and will keep on communicating and interacting. Without getting involved in the causes behind this sustained relations, we may only state that resource management element is a system in itself whose elements (units) interact and communicate to be able to secure the final goal, which in this instance is managing the resources based on the policies of the system.

Now we can get involve in detail of one of the most important challenges faced by systems which are designed based on Organization Theory. That is when resource management element is defined based on Reductionism; all its constituent units are involved in laying down the detail of the resource. It should be noted that while resource management element is defined in Reductionism as a set of abstract, separate units which are identifiable as separate entities in a vacuum, these units maintain interactions and communications among themselves as a consequence of the fact that resource management element is itself a system.

Intricacies of identification of "resource" by the resource management element are thus bequeathed to the constituent units of the resource management. On the other hand, Reductionism requires that particulars and functions of an element should not be incorporated into the overall function when that element is not the subject of our inquiry or, in other words, is not involved in execution of any function within the system. For instance, if we consider RD and LB to be two units of the resource management element in the real world, and if RD and LB are defined in accordance with Reductionism, then LB will divide resource into elements (units) based on those traits of the resource which it needs, so that it will be able to identify resource; RD should do likewise in a world run by Reductionism, however, resource management element is itself a system and there are interactions between RD and LB (these two are not separate entities), and when LB tries to identify a resource its criteria of distinction should include those of RD.

Lake of Efficiency of Resource Management Based on Above Challenges

In Organization Theory, the emphasis is on the two concepts of "Control" and "Prediction". The current emphasis on the use of Organization Theory emanates from challenges encountered in the use of the traditional definition of system. This definition is centered on functioning of different elements of the system in a way that the concerted action would bring about the final goal.

The definition requires that the management elements within the system manage other elements in a way that at each stage of the activity of the system a function is executed by one or more elements. The main challenge emanates from the fact that the traditional definition has been used for machines, where activity of the system means performing of some kind of work by system elements, while we know that activity of a system can be of a non-work nature. Hence, organization Theory would be the theory used in the design of systems and the emphasis would remain on the two concepts of "Control" and "Prediction".

It should be noted that Organization Theory is the only successful theory for system design on executive level. When a unit of the resource management element interacts with a set of other elements as executor of a final task which involves working with the two elements "resource element" and "requesting element", an identification method based on Reductionism would be the best and most efficient method for identification and assigning of tasks. This is adhered to throughout this text and we adhere to the use of some modified form of Organization Theory in the design of the resource management element and some modified form of Reductionism in the identification and assigning of tasks.

The question arises: in what time-space combinations the stated limitations would become a challenge for the resource management element? The issue arise when, firstly, in a resource management system the two managerial tasks of making decisions and executing them are both discharged at one and the same level, namely the executive level; secondly, the resource management element uses Reductionism for identification and assigning of tasks in discharging both of these mega-tasks (decision making and execution); and thirdly, system design for all main parts of the system is based on Organization Theory.

If we investigate the resource management element from a third party's point of view, we will see that the two managerial mega-tasks of decision making and execution are implemented at one and the same logical level and are well inter-twined; while as with other management element, it is imperative that these two mega-tasks remain distinct for the resource management element.

As a result of the above stated situation, resource management element should implement the two concepts of "Centralized Control Structure" and "Predefined Response" to be able to secure its two main goals of "responding to requests" and "exerting control".

One important question arises: can implementation of the concept of architectural design in today's resource management elements remove the challenges brought about by same level decision making and execution?, or can multilayer architectural designs address the challenge?; to answer this question, we will first investigate the meaning of "architecture" as applied to traditional resource management.

The most important challenge faced with multilayer architectural design is the philosophical concept of a systemic view modified to a fundamentally architectural view. These architectural designs are implemented so that the resource management element (or any other element for which the architecture is implemented) may attain alternative and modified views of fundamental elements of the system. In other words, the level of abstraction or the level of involvement of resource management element with other elements could be modified. In today's systems, multilayer architectural designs are used for identification and assignment of tasks of constituent units of resource management element.

Nature of multilayer architecture should be expressive of the relationship between the management element and the resource, in a way that it expresses the relationship based on the concept of system (Theory of System includes the approach of the designers and creators of the system at the time of its design and implementation; it is based on two axes, namely description and implementation). The said relationship itself includes communication, interactions, and give-take relations. In today's multilayer architectures, however, the goal is to present a division of constituting elements of the resource management element, based on Reductionism. This does not mean a rejection of today's multilayer systems; because today's multilayer architectures are defined for systems which are based on Organization Theory, with Reductionism being the main guideline for identifying architectural elements.

Nature of multilayer architectures is based on the concept of, firstly, a resource management element which is divided into units each with one or more predefined tasks and situated as increments in relation to one another. One or more specified task(s) is undertaken at each unit in a way that no overlapping of tasks among units may occur. In the real world, divisions are not incremental. Secondly, nature of multilayer architectures is based on the assumption that system is designed based on System Theory, while in reality systems are designed based on Organization Theory.

It should be noted that these two theories are fundamentally different with respect to their approach to system design (System Theory is used for architectural design of systems while Organization Theory is used for actual implementation).

On the other hand, even when the system design is based on multilayer architecture, the main theory upon which the design is based would be Organization Theory, and element identification and task assignment would be based on Reductionism. As a consequence of adherence to Reductionism, the resource management element regards other elements as divisions of their constituent units, or rather deals only with these constituent units, even on the highest levels of decision making (the separation into units is obviously not of an incremental nature).

Today's multilayer architectures are the result of task division among units created from the division of resource management element into sub-elements/units. While this task division results in a clearer view of the tasks undertaken by the units, it still won't be an exact division with regard to the management levels because of the fact that Reductionism is adhered to in all architectural layers.

Considering the above discussion, the main obstacles which prevent thorough division of the two main tasks of "decision making" and "execution" in multilayer architecture are as follows:

Firstly, in today's multilayer architectures resource management element isn't regarded as an indivisible, abstract unit interacting with other elements it is involved with as a manager would with its subordinates. In other words, units of a modern resource management element interact with their beneficiaries based on specifications of each beneficiary, regardless of the management level the particular unit of the resource management element is situated at.

Secondly, in today's multilayer architectures, the criterion for establishment of a unit would be the division of resource management element into sub elements (as required by Reductionism). Each architectural unit corresponds to one or more sub element(s) of the resource management element, or to one function of the resource management element. However, tasks defined for the resource management element may be different from the sum of tasks of subunits.

Thirdly, the theory used in the multilayer architectural design should conform to the theory used in the implementation of the system. In other words, if the resource management element uses a particular identification pattern at a particular level of its architecture, or if its design at that level is based on a particular theory, the same theory should become part and parcel of the system as it is implemented.

Fourthly, in today's multilayer architectures which are used in systems designed based on Organization Theory Reductionism element identification and task assignment pattern is used at all levels of the system. Reductionism is the only identification method which scan be used at the executive level and the use of any surrogate method would render the system incapable of using its elements for realizing its vision and mission.

Using Reductionism at all management levels, however, would bring about challenges. The main challenge emanates from the fact that Reductionism is in contradiction to the very nature of some of these management levels. Solutions offered thus far have not removed the challenge and in some cases have brought about a new challenge which is usually referred to as "false functioning of Reductionism".

Fifth, in today's systems if the system and subsequently its management element have multiple management levels, all these levels use Organization Theory for their functioning. If we assume each management level to be a subsystem of the whole resource management system, we may observe that some of these levels have outputs, or interact with elements, which are not of an executive nature (the decision making at LB identification stage, for instance, has no execution accompanying it and is "purely" a decision making); hence using Organization Theory in the designing of such level would be unjustified. On the other hand, there are management levels which are of an executive nature. As a result, Organization Theory cannot be viewed as an all-around solution and we may need additional theories to establish systems in one or more management levels.

Sixth, establishment of response mechanisms in today's systems is obviously contingent on access to rich resources. The use of Reductionism identification-assignment pattern is the cause behind such contingency.

While we are still witnessing establishment of systems which emphasize process, it should be noted that systems which are designed based on Organization Theory are faced with two challenges in identifying processes. First, systems whose designs are based on Organization Theory identify units of elements instead of elements themselves (whether these elements are requesting or responding elements).

As a result, the number of interacting entities would be too high. Secondly, the nature of today's systems is such that justifiable requests for resources in them are defined as those which are in line with the mission of the system. Hence a process-based response structure should be able to correctly analyze processes and sub-processes as it responds to some requests. However, for the reason stated in the first part, elements/units involved in responding to requests are a myriad.

Hence the resource management element should be able to manage the system in a way that it could keep track of processes, analyze them, and based on the analysis identify an array of elements which are involved in effecting the process. This is easier said than done considering the large number elements/units involved and their combinations.

When there is talk of process-based response structures, the first and foremost concern should be transferring the time of establishment of response structures from the design stage to the execution stage. In consideration of the challenges just mentioned, what is actually used is a midway concept between a process-based response structure and a predefined response structure. It means that there is an effort to identify the spectrum of requests through analysis of the system. Predefined structures, nevertheless, are in contradiction to process-based structures; even though the combination (or rather the midway concept) explained above is used for a response structure in many of today's systems.

To prevent excessive intricacy of process analyses, a policy of reducing the activities of the resource management element is followed in the design of modern systems. While this approach makes it possible to circumvent challenges created by focus on tasks as in Reductionism by using predefined structures, it has the drawback of imposing fundamental challenges on resource management element, which can prevent this element from discharging its two main tasks. An example of such challenges is lack of support for all activities which may help fulfill the system's vision. One solution could be a review and reduction of the mission of the system, thereby reducing the gap between vision and mission.

Seventh, if we look again at the nature of the multilayer architecture of the resource management element we would observe that there are units of the resource management element in each layer which endeavor to fulfill a predefined task. Layers of the resource management element in modern systems are defined by their functioning and the relationships among them are defined within the multilayer structure. Each layer has an output interface between it and those elements which use its output, as well as an input interface for receiving the information it needs.

In the multilayer architecture of the resource management element, relationships of the constituent units of the resource management element are predefined regardless of the particular array according to which these units are aggregated. In Organization Theory, the focus is on the capability of the element (or in fact on the capability of constituent units of that element). Hence, it should be made clear what is to be the input and what is to be placed at the disposal of another element as output. From the viewpoint of the resource management element, the smallest, indivisible units are those to which tasks can be assigned.

The resource management element should be able to identify the input and output of units based on their specifications. This renders multilayer architecture incapable of coping with new situations because there is no separation between decision making and execution in this type of architecture.

Limitations of Resource Management in Using Reductionism and Organization Theories:

Using Reductionism as the method of identification of elements and assignment of tasks along with Organization Theory at the architectural level of the resource management element causes problems for the resource management element in discharging its two fundamental tasks of response and control.

These problems are more conspicuous in modern decentralized systems which lay huge emphasis on transparency, expandability, and communication with other decentralized systems. It is noteworthy that as scientific-engineering priorities of the $21^{st}$ century are in constant change, there is a need for systems which can cope with new situations and show adaptability in problem solving in the broadest sense possible. Such adaptability can be achieved only when the resource management element itself has versatility in responding to variegated requests.

We will now discuss the challenges brought about by: first, using Reductionism as the method for identification and task assignment, and second, using intertwined decision-execution architecture; we will see how these practices can adversely affect the versatility of the resource management element.

The Limitation of Controlling Task in Resource Management:

To discharge tasks such as controlling resources, controlling responses, and controlling interactions between the resource and requesting elements, resource management element should be able to collect a wide range of information. Keeping a large store of data on identification of elements and assigning of tasks may be possible for smaller systems which closely follow Closed Systems Theory, but it may become a major challenge if, for any reason, the system shows uncertainty in its behavior, as is the case for most of today's systems, or when we are dealing with a medium sized or large system (depending on the number of elements in the system and their range of functioning (as resource or requesting element).

In such cases there will be a need for central data storage structures which can keep data related to identification of elements and assignment of tasks based on Reductionism. While server-oriented structures can enhance functionality and be helpful in realization of the system's vision, they nevertheless bring about new challenges in relation to expandability of the capacity of the system for discharging newly defined tasks or using newly defined resources.

The information collected by a central control element can help the resource management element in making decisions about its control tasks and execution of control operations. This is because systems which are designed based on Organization Theory and which use element identification-task assignment method of Reductionism can define a task for one or more elements of the system only when the system has adequate and detailed knowledge of the nature of that element.

Examples are galore in systems such as computer systems, banking systems, business systems, and the like which are designed based on Organization Theory and which use element identification-task assignment method of Reductionism. In most of these systems we can find task distribution elements or elements which generate organizational methods and structures. Such elements in these systems usually function as sub-elements of the resource management element. Task distribution elements are charged with the task of distributing tasks among elements in a way that the system's final goal can be achieved.

Optimal functionality, maximum profitability, etc can be set as final goal of a system. Task distribution element (or the element which generates organizational methods and structures) defines tasks for itself based on Reductionism, and thus divides itself into units each of whom are charged with part of the duties of the original element; a division which obviously cannot be regarded as a division into increments.

If we want to exert control and supervision of the mechanisms used by units of the task distribution element, we would need a centralized structure to provide the control elements with information on nature, specifications, and functions of units of elements. In other words there must be structures contrived within the system which can make decisions about the division of mechanisms used by sub-element divisions which are created based on the division of the task distribution element.

On the other hand, units created by the division of the task distribution element interact with one another and interactions between executive elements within the system are bidirectional; hence the resource management element should create structures within the system through which to collect and keep information on both elements involved in a distribution transaction and to subsequently exert control over the operation of the distribution mechanism.

One of the main tasks of the resource management element is implementation of facilities for responding to requests within the system. By "facilities" we mean "all the structures the resource management element creates within the system to enable itself to respond to requests". These structures consist of elements involved in responding and communications, and interactions among them.

Response structures and the pattern of implementing them are among the most important policies which should be set out by the system. A response structure is a structure which is formed either along with the system or as a request is formed/made, and which determines which elements and based on which communicative and interactive patterns should respond to the requests made within the system.

When talking of response structures, we should keep in mind that the resource management element (or the part thereof which corresponds to the forwarded request) should create a pattern of communication and interaction among the elements involved and manage these elements based on the created pattern.

It should also be noted that the system mentioned above considers the request element to be an individual, indivisible element; because at the time of the designing of the system based on the vision, it has been determined what requests the system would be able to respond to. Hence "request" is part and parcel of the system. The main challenge in systems which are based on Organization Theory becomes manifest when the number of resources within the system and subsequently the number of defined and identifiable requests becomes so large that the frequency of appearance of requests exceeds the maximum rate which the resource management element can handle.

When the element identification pattern conforms to Reductionism, there would be no possibility of responding to requests using optimized response structures whose functioning is based on the nature of the request itself. In such cases the system will try, either during its designing stage or during a specified respite after it has been established, to create certain predefined structures which will activate a request-specific response structure whenever a request is launched within the system.

The above concept is currently being used in a vast majority of man-made systems. When an individual enters an organization as "generator of a request" and requests some function from that organization, the route taken by elements of the system for responding to the request will be a well-defined, request-specific route, according to which certain elements of the resources within the system will communicate and interact with one another based on a certain pattern to address the generated request.

In other words, systems which are designed based on Organization Theory normally handle requests based on a predefined task summary for each resource element as well as a specified response route.

It should be noted that the mission of the system determines what requests can be granted by the system. That is why "request" is not divided into sub-elements or units and is mainly treated as one single and indivisible element by the resource management in Reductionism.

Two main conditions should be taken into careful consideration for establishment of a response structure or contrivance of a mechanism for responding to requests within the system:

A—Resource management element should have full knowledge of capacities of the smallest (indivisible) sub-element/unit of the resource B—Resource management element should have full knowledge of the array/arrangement patterns of resource elements within the system, in a way that it would be able to address requests in an efficient manner In fact, designing of response structures can be carried out (either at the time of designing of the system or at the time of its implementation) only when the resource management element has adequate knowledge of the two above stated matters.

Considering the very nature of systems which are designed based on Organization Theory and which use Reductionism for element identification-task assignment, it would seem that the resource management element, due to its detailed and adequate knowledge of sub-elements/units of the resource element, can establish the needed response structures at the time of implementation of the system.

This would be a justified assumption if it is granted that response structures are established solely based on the knowledge the resource management element has of the capacities of constituent units of the resource element. It should be noted, however, that the pattern of interactions among sub-elements/units of resource elements which are divided into units in accordance with Reductionism is one of the important factors which prevent establishment of response structures during the implementation of the system.

It should be noted that in smaller systems when the resource management element uses Reductionism for element identification/task assignment, because the number of combinations of arrays of sub-elements (units) resulted from the division of the resource element (as part of creation of a response structure which would correspond to the nature of the request) is not preposterously high, the resource management element can control, calculate, and keep track of these combinations during the execution of the system.

Hence both preconditions for creation of response structures at the time of execution of the system are met and the resource management element can create these structures during the execution. In contrast, in bigger systems and in those in which the number of sub-elements (units) created by the division of the resource element exceeds a certain boundary, the number of possible arrays of interaction and communication among sub-elements (units) becomes too large and the second precondition for creation of response structures at the time of execution of the system is no longer fulfilled.

When we try to describe mission of a system by using graph algebra, it is likely that the elements at graph peaks of response structures become excessively numerous. The number of lines connecting the elements at these peaks while satisfying the condition that the system's mission would remain in line with its vision may become too high. Controlling such structures and identifying, from among the multitude, the structure which can efficiently (and in line with the vision of the system) respond to the request is not an easy job and may even prove impossible.

In a general discussion of the mission of systems which are designed based on Organization Theory and which use Reductionism element identification-task assignment method we should keep in mind the following three realities. First, in real-world systems the number of units created as a result of division of resource elements of the system is normally very large.

Second, there is some overlapping of both capacities and tasks among these sub-elements/units. Third, establishment of response structures which function in line with the vision of the system cannot be done at the time of execution of the system. The main reason behind the last point is the fact that there is a large number of possible arrays which can be created within the system by the resource management element; analyzing and assessing these arrays is a time consuming and costly task for the resource management element, to the extent that assessing these arrays and the system's general condition vis a vis each one may take up most of the effective life span of the resource management element.

That is exactly why predefined structures are used in such systems. In short, the designer decides at the very time of establishment of the system what response structures should be contrived within the system, what elements should be involved there, and what interactions and communications should be allowed within the response structure so that the vision of the system could be preserved. The designer thus creates structures which are actuated by requests and in accordance with the nature of the requests during the execution of the system.

The most important question in this regard is probably the time and cost spent for the establishment of response structures by the resource management element when these structures are based on units/sub-elements whose capacities are fully known (and may be overlapping). When answering this question, we should bear in mind that at the time of establishment of response structures, the resource management element would require conformity with the system's vision, and hence many structures won't be acceptable to it.

While existence of a wide range of units whose capacities may be overlapping makes it possible for the resource management element to create its response graphs using a large number of graph peaks, it should be noted that from the viewpoint of the resource management element these response graphs too should serve the vision of the system, and due to the large number of units and very large number of possible interactions among them, verifying this may prove too costly and time consuming for the resource management element.

When the number of elements at graph peaks is smaller or equal to the number of resource elements (and not the number of units created by the division of resource elements), or, when these graph peak elements constitute a subset of the set of resource elements, then compiling the interactions among the graph peak units would be a more acceptable task for the resource management element.

Two important conclusions can be derived about the establishment of predefined response structures in the above mentioned systems; conclusions which may be of utmost importance for managing the resource management element:

Firstly, using predefined structures renders the system capable of meeting unpredicted changes in the request at the time of execution. In systems designed based on predefined structures, nature of changes in requests is predefined at the time of designing of the system; hence the response structure knows in advance what may cause changes in the requests, and requests cannot be changed in ways not defined in the predefined structure.

When a request enters the system, the response structure divides the functions which should result in responding to the request into sub-functions. Each part of the response structure takes on a few of these sub-functions. This means that the nature of the request undergoes repeated change as the request goes through the system, because each group of the said sub-functions target only part of the original request; in fact as the request goes through the system and the system executes sub-functions whose execution constitutes the response, after execution of each sub-function part of the request is granted and the remaining part would thus be of a different nature compared to the original request.

In systems which are designed based on predefined structures, nature of a request at each stage of response is totally and clearly known to the resource management element; hence all the changes the request undergoes as response sub-functions are executed are also known to the resource management element. In other words, predefined response structures know at each moment of the life of the request how to respond to what has remained of it, up to the moment when the response is complete and the request is met. This can be the source of new challenges especially in relation to systems in which requests are of an uncertain nature.

Secondly, systems with predefined structures may present challenges if they are of an expandable nature. Expansion of such systems generates new requests within the perspective of the system's vision. Expandability involves, by its very definition, changes in the elements within the system and thus changes in the response structures.

When a system is expanded, there is a high probability of forming of requests which are of a totally new nature, while still within the perspective of the system's vision; there may be no response structures available within the system for addressing these new requests. Furthermore, expansion may bring about a need for change in management of response structures.

Resource Management Challenges:

Considering the nature of scientific and engineering problems of $21^{st}$ century, which brings about the need for a flexible resource management element which can handle changes in the requests as well as changes in the activities of the system as long as these new requests and activities remain within the framework of the vision of the system, there are a set of challenges which a resource management element should be able to meet before it can support the execution of the above stated programs.

It should be noted that these challenges stem mainly from the fact that A) the prevalent theory in the design of today's systems is Organization Theory; B) Reductionism is the pattern of element identification/task assignment used for all elements of the system. This adds to the complication involved in identification of resource elements, designing of the resource management element, and keeping track of exchanges and interactions among them; C) the two concepts "decision making levels" and "execution levels" are not fully separated and distinct.

A resource management element which satisfies these three conditions can be termed "conventional (or traditional) resource management element". In the real world, these three traits create the following challenges when the resource management element seeks to execute a program which is of a dynamic-interactive nature.

A. Challenges of Activities with New Natures

Assumption:

In a system designed based on Organization Theory in which Reductionism is used for identification of elements and assignment of tasks, execution of new activities (without contradicting the system's vision), would bring about many challenges, with regard to creating means for responding to requests and controlling these means, for the resource management element.

Question:

in a $21^{st}$ century system, the nature of activities may undergo changes in many aspects throughout time.

How does this Question Relate to Issues of the $21^{st}$ Century?:

The concept of "problems of a new nature" is one of the two main distinctive features of the problem solving activities of the 20 century.

Challenge Faced by the Conventional Resource Management Element:

Among the most conspicuous consequences of the use of Reductionism in identification of elements and assignment of tasks and the use of Organization Theory as the basis for design of the system is the challenge faced by the resource management element in meeting "problems of a new nature".

The challenge faced by such a system emanates from the need of the resource management element to identify new requests (and then to redefine systems means of responding to them), redefine resources (redefine them on the basis of the nature of the new activities, requests associated with these new activities, and the capacity of the resources for meeting these requests), and redefine control mechanisms within the system (adapting these mechanisms to the newly shaped requests).

In other words, when the system deals with "problems of a new nature", there is a need for "profound and drastic" changes in the management element of the system. One of the reasons the conventional resource management element cannot meet the above stated challenges is related to its use of predefined structures.

B) Challenges of Inability to Handle Numbers of Resources:

Assumption:

It should be remembered that when a system expandable, it may undergo negative expansion (or "contract") as well. Expansion (contraction) corresponds to an increase (decrease) in the number of elements of the system.

This can be viewed in different lights. Expansion (contraction) means that there are more (less) elements which regularly launch requests; on the other hand, it also means that there are more (less) resource elements deployed to meet these requests. Increase in the number of resources within the system occurs for a number of reasons; among them are: system scalability, appearance of new needs within the system, defining of new requests within the system, and/or incapacity of the existing resources for responding to existing requests.

Question:

How can the resource management element discharge its two main tasks while there is an increase (or decrease) of resources?

How does this Question Relate to Issues of the $21^{st}$ Century?:

Programs which are of a dynamic-interactive nature are normally executed over systems which are capable of increasing (decreasing) the resources within the system.

Challenge Faced by the Conventional Resource Management Element:

Reductionism calls for knowledge of sub-elements which constitute resource elements, their specifications, and limitations. Using Reductionism, we would be monitoring changes in the smallest manageable sub-elements which are under management of the resource management element.

Accordingly, mechanisms of generating means for responding to requests as well as mechanisms of controlling resources are changed from "resource level mechanisms" to "sub-element level mechanisms". This results in the need of having too many control and response mechanisms at our disposal, especially at times when the number of resources increases (or decreases).

In the latter case, we will be seeing tangible changes at the resource management level aimed at executing response and control mechanisms. The most conspicuous effect of these changes would be increased complication of the resource management element and consequently a generalized complication in all aspects of resource management.

Assumption:

The range of resources defined for the system is broadened.

Question:

How will the resource management element be able to manage resources which were not previously defined for the system?

How does this Question Relate to Issues of the 21$^{st}$ Century?:

Dynamic, interactive nature of 21$^{st}$ century's programs requires that the program be given the possibility of using new spectrums of resources as it is being executed.

Challenge Faced by the Conventional Resource Management Element:

The most important trait of identification of resources using Reductionism is the division of each resource element into a number of sub-elements and managing these sub-elements (instead of managing the original elements) on the basis of their particulars and specifications and limitations. When a new range of resources are defined for the system, the resource management element firstly doesn't have the Reductionism pattern necessary for dividing each new resource into sub-elements, and secondly even if it has the necessary pattern, the division into sub-elements of many resources will result in increased cost and duration of execution.

C) Changes of Inability to Deal with the Different Types of Resources in the System:

Assumption:

The system is capable of functioning while the number of element is changing; the system has the capacity of geographical and/or managerial expansion.

Question:

How can the resource management element instantly adapt to geographical and/or managerial expansion and keep on executing its two main tasks while the system is expanding.

How does this Question Relate to Issues of the 21$^{st}$ Century?:

Systems which execute 21$^{st}$ century's programs should be possessed of scalability and openness, so that they would be able to meet the requirement of execution of these programs.

Challenge Faced by the Conventional Resource Management Element:

A system may be scalable in a geographical sense; in that case it may undergo drastic changes in relation to response time and consequently response structures and patterns. Studying the concept of scalability of systems designed based on Organization Theory; we will observe that changes in system geography will necessitate corresponding changes in response patterns due to increased distance between the requesting element and the resource as well as other limitations and constraints faced by the resources at the time of responding to the requests. This in turn will bring about the need for change in control patterns used by the system.

Control pattern are usually designed in line with the nature of the system and interactions among system elements (and in particular between the requesting element and the resource). Hence geographical changes call for a review of the control patterns used for the system.

Effects of Geographic Change on Time Management Systems:

A system can be scalable in its managerial aspect too. When a system changes its domain, it incorporates into itself new managerial fields, or attaches to itself new managerial fields, or detaches such fields from itself. Resource management element should be able to discharge its two main tasks in the new managerial fields as well, without prejudice to its management nature. Using Reductionism as the pattern for identification of elements and assignment of tasks would bring about two important challenges.

Firstly, the use of Reductionism as the basis for element identification means that elements within the system should be identified and analyzed by the resource management element on the basis of Reductionism. Secondly, the management element within the newly added field should conform itself to the new control mechanisms; otherwise there would be two distinct control mechanisms within the same system, and these may even contradict one another (each managerial domain has its own distinct pattern of Reductionism).

Assumption:

If we intend to investigate the set of activities which the resource management element performs to discharge its two main tasks of controlling resources (while responding to requests) and implementing response structures, we should take note of the two following points:

Firstly, nature of the activities performed by the resource management element is vastly dependent on the requests which exist within the system and the resources which are defined for the system. If we accept as the most basic definition of the resource management element "an element of the system which can manage resources of the system" then a general description of the activities performed by the resource management element could be based on the nature of resources and the nature of the requesting elements.

Secondly, activities of the resource management element can take on different forms and patterns depending on what requests appear within the system and based on what response patterns they are responded to.

Question:

How can we have a single resource management element for all types of resources within the system.

How does this Question Relate to Issues of the 21$^{st}$ Century?:

Due to their interactive-dynamic nature, programs of 21$^{st}$ century call for a new definition of the function of resource management element. Why? Because scalability of and/or execution of new tasks by the system requires adaptability and versatility of the pattern of functioning of the resource management element. "Change" brings the need for the resource management element to define new functions for itself with the aim of remaining capable of executing its two fundamental tasks. If we want to redefine the resource management element to keep it capable of executing its fundamental tasks, we may end up with a system which needs to be redefined for each change, or in constant redefinition.

Challenge Faced by the Conventional Resource Management Element:

Normally, when a system is being designed, some tasks are defined for its resource management element. These tasks are defined based on specifications of the system which is being designed as well as specifications of the resources and requesting elements. In today's systems, the above stated question is approached in two ways. Either each updating of the resource management element is viewed as requiring a redesigning of the system, and hence of a new management, or it is assumed that implementing of modifications or "patching" of the management element would be sufficient.

Whatever approach is taken, changes in the system or in the resource management element requires changes in the functioning of the system in a way that the resource management element retains the capability of executing its tasks.

The main reason for such challenge is the need of the resource management element to know the detail of each resource element and to define control-response mechanisms based on this knowledge at decision making/execution levels. Hence the resource management element lacks uniformity in its dealing with resources at decision making level. Another contention is the intertwined nature of decision making and execution levels, which causes lack of flexibility in dealing with changes.

Assumption:

Resource management element can create flexible response structures which can be formed as they are executed.

Question:

How can the resource management element create flexible response structures which can be formed as they are executed?

Relationship with Issues of $21^{st}$ Century:

Applied-scientific programs of $21^{st}$ century naturally emphasize contrivance of a response structure in the system. Nevertheless, this response structure should: firstly, be implemented in the system during the execution of the system. Secondly, should conform to the nature of the requests in a way that it can cover requests which undergo changes in their nature. Thirdly, the pattern used in creating the response structure should conform to vision and mission of the system, and fourthly, as what is designed "to be" will be there as the system is executed, the used pattern should be based on a philosophy and practice with regard to which it would be possible to guarantee that execution of the response task by the response structure would result in responding to the request in a timely manner.

On the other hand the theory used for creating response structures should be compatible to different systems with different sizes, different managerial fields and different requests within the system. The pattern used for creating response structures should be executable by each and every one of executive elements of a system.

Challenge Faced by the Conventional Resource Management Element:

conventional resource management element uses predefined structures. Creation of response structures is dependent on the two concepts of "identification of the elements involved" and "interactions and exchanges between the elements involved", and because the resource management element uses Reductionism to identify the elements involved, it has a comprehensive view of all the elements within the system.

The use of centralized structures for controlling the elements over the execution of response makes the identification even more accurate. It should be noted, though, that the resource management element faces a huge challenge due to the large number of elements within the system and the large number of exchanges and interactions among them.

The main concern when using predefined structures to tackle dynamic problems is the flexibility of the structure to handle new activities. During the course of responding to a request, if the system tries to base the response on a predefined response structure, it may become incapable of responding would there be any changes in the nature of the request as it is being responded to (whether as a result of part of the request having been responded to and the remaining part being of a different nature compared to the original request or as a result of new request which may arise as the original request is handled).

Assumption:

Resource management element supports local autonomy of the elements within the system Question:

How can the resource management element support local autonomy of the elements within the system?

Challenge Faced by Conventional Resource Management Element:

One of the main challenges faced by systems which are designed based on Organization Theory is defining the system on the basis of specifications of its elements and resources. In systems designed based on Organization Theory, because Reductionism is used as the pattern of element identification/task assignment, it would be pivotal to the system to know limitations, strengths, and particulars of each element. Only then can tasks be assigned to elements.

Using Reductionism would result in change of the level of abstraction of the system from elements to sub-elements/ units. The most conspicuous trait of a sub-element is that it can perform only one task at a time. If we consider a sub-element as a system in itself then it would be a system which can perform only one task. If, on the other hand, we bring the level of abstraction to element level, we would have entities which are capable of multitasking, and thus can be reasonably accurately being defined as systems.

Each system has its own vision and mission and this means that its constituent elements are in constant communication, co-operation, and interaction to secure the system's final goal (the system is here the one which is defined based on its constituent elements). This final goal can be either wholly or in part realized as an element's role within the system is fulfilled. For today's resource management element, the smallest element is an element whose vision and mission is exactly the same as its vision and mission when it is placed within the framework of the system. Hence today's resource management element uses concepts such as "task predefined within predefined structure" and "control mechanism".

Assuming Reductionism to be the pattern used by the system for identification of the elements, the resource management element would be pushed to employ centralized structures to exert control over activities within the system. Control task involves all the mechanisms used by the resource management element from the time a resource is identified within the system till the time when it is used by the requesting element.

Using Reductionism as the pattern for identification of elements, we will be dividing each resource element into sub-elements/units. To take account of these sub-elements (instead of the original resource elements), and to identify each of them on the basis of its specifications, the resource management element would have to use centralized structures for keeping of information needed for execution of control tasks.

Using centralized structures will not create any challenge for the resource management element provided that the system under consideration is small. When, on the other hand, the size of the system exceeds a certain threshold, or when the system incorporates new managerial fields each with its own specific policy of control of resources, or when the system has vast geographical expanse, then the use of centralized structures by the resource management element for exerting control may become a serious challenge in itself.

Conclusion:

It seems, with regard to the challenges listed above, that the reason why most of them seem unbeatable is the use of predefined structures by the resource management element. When the system tries to access new resources, respond to unprecedented requests, expand and scale forth for whatever reason whether by incorporating new elements or by incorporating whole new systems, it will face challenges in relation to its mission (arrays of elements, interactions and exchanges among them), challenges which may eventually culminate in the collapse of the system into a state which would in fact be a new system.

When talking about response structures, we should bear in mind that there is a close relationship between the two concepts of "response structure" and "resource management element". It wouldn't be possible to say which one precedes and creates the other based on a particular set of patterns. Nature of response structures has a huge effect on the nature and functioning of resource management element, to the extent that many of the latter's behaviors can be attributed to the response structures at work within the system.

In fact, it can be asserted that in systems whose response structures are designed at the time of the designing of the system nature and functioning of the resource management element are directly determined by nature and functioning of response structures. It is due to the predefined response structures of such systems that the performance and functioning of the resource management element are seen to be completely in concordance with predefined structures.

Functions and sub-functions defined for the resource management element are designed based on predefined structures and sub-elements which constitute the resource management element are designed and implemented based on what management tools are needed for directing the predefined structures as requests are being responded to. Due to the strong interdependence between the resource management element and predefined response structures, and due to the functioning of the former being in consequence of the needs of the latter, any changes which may occur in the predefined response structures will cause a huge challenge for the resource management element.

One factor which alters the nature of response structures within the system is expansion of the system caused by introduction of new elements (with new requests). In such cases response structures would undergo fundamental change and this may lead to the collapse of the resource management element.

Related Work:

Nature of resource management element, its sub-elements, its functioning and its performance are to a very large extent dependent on the nature of the response structures. As stated earlier, one of the main challenges faced by today's resource management elements emanates from the fact that they are used in systems whose response structures are defined at the time of the designing of the system, and thus many of performance specifications of the resource management element reflect the pattern used in the designing of the response structure. Here we will discuss two response structures normally used in today's systems and see how challenges enumerated in chapter 2 are realized in a real world system with one of these two response structures in operation.

In a nutshell, there are two types of response structure in operation in today's systems. The first type, which is more commonly encountered, is called "Hierarchical Response Structure". These structures are imitations of the class structures found in many societies. There are normally one or more elements acting as "sever" in a hierarchical structure. A server is an element which is situated at the root of the hierarchy (in a graph or tree diagram of the system) and has priority and precedence to other elements in all activities of the system.

Server element has full and total knowledge and hegemony of and over other elements of the system and any action within the system is either started by the server element itself or by an element which has been authorized by the server element to start the action. The knowledge and hegemony held by the server element includes knowledge of condition of resources and access to these resources.

The theory used in the designing of hierarchical systems is based on Organization theory; while element identification/task assignment is based on Reductionism. Using Reductionism in hierarchical systems means firstly that the pattern used by the system for creation of a response structure is equivalent of a duty-oriented pattern, secondly that the element within the system charged with the duty of element identification/task assignment is the server element.

In hierarchical systems, depending on the function of the system, in some case an activity-oriented response structure is adopted. Whatever pattern is used for creating the response structure in a hierarchical system, server element is the element which determines the assignment of tasks to elements of the system. In hierarchical systems, either the server element itself dictates the system's vision and mission, or it does it in lieu and as the agent of the designer of the system.

Based on the meaning of "activity", a new definition of server element is offered in Tira literature. According to this definition, a server is an element of the system which is charged with the duty of turning a "current activity" into a "completed activity".

There are another category of systems, which are formed based on "market economy" and which don't incorporate a server element. No name is universally agreed upon for these systems. They are alternately called "Japanese management structures", "peer to peer systems", or "no server systems". In Tira literature they have been called "island systems". The most conspicuous trait of island systems is lack of server element.

Island systems differ from one another mainly with respect to their resource management element. Considering the need for defining a vision and a mission for the system and the consequent indispensability of an element within the system whose task would be to implement the vision and mission, one important challenge faced by island systems would be to implement the vision and mission while being deprived of a uniform element array.

In its most general form, a system is formed to answer the needs stated in its manifesto (which is itself a manifest of the system's vision-mission). When studying a system's manifesto, we will encounter many explicit or implicit references to problems and "needs" existing in the environment in which the system is formed. This applies to all systems regardless of type or nature. It should be noted, though, that the needs mentioned in a system's manifesto are expressed in very general terms. If we carefully observe the manner in which "needs" are addressed by a system, we will see that the system tries to present solutions for them (the system's mission) without regard to its own manifesto, and tries to present problems and needs it has been formed to solve and answer.

What is presented as the fundamental goal or the manifesto of a system should be reflective of the problem existing within the society, and ideally should be expressive of a general solution to that problem. Some experts believe, however, that the mentioned general solution should be announced by the leadership of the organization and not in the manifesto of the system.

Considering the Response Structure in Hieratical Systems

In hierarchical systems, organizational formation structures and functioning of their elements are defined in advance. These systems normally have a server element defined within the system which executes the Reductionism pattern of element identification-task assignment using predefined structures.

In such systems, organizational formations are formed in a way that the needs of the system are determined and predefined at the time of designing of the system and the system itself is designed in a way that its needs are addressed throughout its duration.

If the nature of the problem for which the system is established is such that all its aspects and layers can be investigated as the system is being formed, then hierarchical system would be the best choice for addressing it. Presence of the server element within the hierarchical system and the full knowledge the server element has of the system makes it possible to execute in the best style the adopted solution to the problem for which the system has been established.

Hence the most important trait of hierarchical systems is that all aspects and angles of the problem for which the system has been established are totally known. If a problem is "known", or in other words all constraints, limitations, parameters, inputs, and outputs of the problem are well identified, then hierarchical system equipped with server element is recommended for tackling it. A problem whose constraints, limitations, parameters, inputs, and outputs are well known is termed a "declared problem".

When constraints, limitations, parameters, inputs, and outputs are well known (this "being well known" is relative of course) to the designer of the system, the central element uses Reductionism identification pattern to make decisions about what activities should be undertaken for solving the problem and what elements can be deployed for performing the activities. The server element has full knowledge of both the elements within the system and the specifications of the problem which is to be solved (the designer has implemented the information in the server machines) and hence it is the server element which can optimally tackle the problem in a hierarchical structure.

Clarity of all aspects of the problem (clarity being a relative term) gives the designer of a server-equipped hierarchical system the opportunity to specify from the beginning the role of each element of the system in solving the problem. All elements of the system which are involved in solving the problem are somehow dependent upon the server machine in their executive operations.

All relations among elements of the system are thus pre-specified in a hierarchical system, and can be displayed as mathematical graphs (equivalent of hierarchical structures). This means that when a request appears within a hierarchical system, manner of responding and elements which are to be involved in responding (whether the server element itself or elements to which are assigned tasks by the server element) are totally specified and known. In such systems, resource management element executes its tasks within the server element and through sub-elements of each element which is included within the hierarchy.

The set of control activities of the resource management element is usually contained within the server element. This means that control activities of the resource management element which are in tandem with the overall system policy are contained within the server element while other control-related tasks are executed by control sub-elements which are located in other elements of the system and which control resources within the system.

Surd Problems:

On the other hand, mechanisms and patterns related to establishment of means for responding to requests are active and running in the server element, while units involved in the establishment of these means, which should activate or deactivate response mechanisms in accordance with commands they receive from related units in the server element, are constituent parts of other system elements.

Normally, when a request appears within the system, it is conveyed to the server element and the server element uses Reductionism to determine what tasks should be assigned to which elements for a response structure to be established. The assignment of tasks is done based on specifications of elements. Because the problems dealt with by hierarchical systems are predefined problems, the server element usually uses predefined response structures to respond to requests.

Response control within the response structure is done based on information received from the executive units by the server element. Prevalence of the server and dependence of the operations on the server cause challenges for these systems which are discussed in chapter 2. Server becomes a bottleneck of the system when it deals with new problems or problems of a dynamic nature or problems which call for scalability of the system.

Surd problems are a category of problems whose exact nature, level of intricacy, constraints, and subdivisions are not fully defined or obvious, and as preliminary parts of the problem are solved, light is shed on the subsequent parts until the problem is fully solved by solving of all its constituent parts.

When we say that a problem is surd, we may be describing one or both of the following two situations: 1—the designer of the system does not have total command and knowledge of the nature of the problem whose solution is assigned to the system; in other words, the designer is designing a system which will be dealing with an unknown problem. An unknown problem is a problem about learning the rules governing a natural phenomenon whose nature is unknown to the designer of the system.

In such cases the designer uses the known rules of the technical purview or the "field" to which the problem belongs to make a preliminary design of the system and the system, during its lifetime, uses the mentioned known rules to learn about the unknown rules which govern the phenomenon under consideration. Hence the approach which would be taken in dealing with the problem wouldn't be known in advance to the designer and the system (and consequently the resource management element) should be able to tackle the dynamic aspect of the problem.

Problems studied in the field of the black holes are examples of such undertakings. 2—The problem is known to the designer but different situations may occur as it is being dealt with (and correspondingly, different situations may arise within the system at every moment of its lifetime). Identifying and defining all these situations (which may prove too numerous) in advance could be a formidable task. In such cases we say that the problem has a dynamic nature.

There are in fact the two concepts of "dynamic pattern" and "dynamic nature". When the designer knows the exact nature of the problem (the natural phenomenon whose governing rules are to be discovered) for which the system is being designed, we are dealing with a dynamic pattern; when, on the other hand, the designer aims to design a system whose task would be to help illuminate the very nature of a problem and determine the purview to which it belongs, we would be dealing with a dynamic problem.

Launching space shuttle Discovery would constitute a dynamic pattern in which the general scientific rules governing the launch are known to the designer, but there are a multitude of situations which the system involved in the launching may encounter. Understanding these situations and establishing response structures capable of responding to requests which may appear in each one of them would constitute a variegated dynamic pattern.

Studying black holes, on the other hand, represents a dynamic problem; for such problems, the natural scientific rules which govern the phenomenon under consideration are not fully known to the designer and the system is created partly to illuminate these rules by the use of known scientific formulas and principles. Today's island systems are typically designed to tackle problems of a dynamic nature.

Approaching the subject of dynamic patterns and dynamic problems with an eye on the processes and activities within the system which generate requests that should be handled by the resource management element, we will see that when the system is tackling problems of a dynamic pattern the resource management element would be faced with processes which may raise different and varying requests during their lifetimes. In such cases the resource management element may be able to contain the situation if it has a wide range of resources at its disposal as well as the needed control and implementation mechanisms. It would be quite different with problems of a dynamic nature, where the very nature of the requests which appear within the system may be varying.

Server-Less Systems (Island Systems):

When compared to hierarchical systems, systems which lack server element demonstrate a totally different behavior with regard to responding to needs. Island systems are in fact a set of management fields incorporated together with the aim of solving a surd problem. Problems which are tackled by these systems are not always clearly and adequately delineated and many of their parts may be in an embryonic and vague state.

In fact problems for solving of which island systems are established are usually of such a nature that the resource management element within the system does not have a clear view of the resources needed for responding to requests which may appear as the problem is tackled. At first, only an outline of the problem is known to the resource management element and the resource management element scarcely knows what response structures it should contrive within the system.

Problems which are relegated to island systems are mostly problems of a dynamic pattern. While the nature of such problems at each stage of the solution (i.e. when part of the problem has been disposed of) does not fundamentally differ from the previous stage, it is still very possible that requests are raised in relation to the solving of such problems which are totally unpredictable for the resource management element.

What requests may be generated at each moment when a problem of a dynamic pattern is being solved depend on the manner the previous requests have been responded to. To get a better view of the matter, consider a problem which is simultaneously being tackled by a hierarchical system and an island system. Assume that this problem can be subdivided into 4 primary subdivisions (sub-problems), each of which can be further subdivided into 4 secondary subdivisions.

In the hierarchical system, due to the total knowledge the server element has of the elements within the system, the 4 primary subdivisions are relegated to 4 elements of the system which are deemed by the server element to be capable of tackling them. From then on each of these primary subdivisions are viewed and treated by the system as an independent problem which is being tackled by a subsystem.

4. PMamut:

In this section we explain principles of PMAMUT resource management theory. Before introducing PMAMUT general principles, it's noteworthy that PMAMUT is designed and implemented to resolve mentioned challenges regarding resource management in large scale (distributed) extended systems which have capability to execute 21 century's scientific applicable plans (having dynamic feature), so that it will be able to support and resolve all challenges mentioned in chapter 2 as well as providing a suitable solution for each one.

Exact scope of PMAMUT is to present a framework for resource management at large scale distributed systems. In PMAMUT literature, the concept of distributed scope refers to classic distributed system and utilizes the same definition that is referred to, in distributed systems. In PMAMUT, being large scale means extendibility (increasing or decreasing system's elements) in a way that the system can expand itself regardless of sub-layer base in order to access its causes.

Regarding that one of the major examples of nowadays distributed systems is the meta network of internet, so resource management theory is designed and implemented based on the fact that sub-layer base is a substrate like meta network of internet having enormous elements inside. The element is defined just when applied. If the element is mentioned somewhere with no definition, then it refers to machines existing in meta-network of internet.

Existence of disharmonic elements in internet meta-network has no effect on general principles of PMAMUT according to the theoretical entity of PMamut resource management, unless when PMAMUT wants to utilize the special features of the elements (machines existing in internet meta-network), then the heterogeneous modes supported by PMAMUT management theory and the modes not supported thereby will be mentioned.

Other expressions and words used in PMAMUT literature is described in details in this section. This is noteworthy that PMAMUT is a framework for managing various resources on the distributed large scale systems with characteristics like flexibility and inexistence of prefabricated structures and not needing the server-based structures.

On the basis of the framework entity of PMamut, the PMAMUT literature is written on the basis of theories that can be applied to any system (computer and non-computer) that 1: have the challenges mentioned in chapter two, 2—are similar to the system described by PMAMUT, so that the general principles of PMAMUT are verifiable on them.

The school of system designing means, what theory and model are the system designing theory and element identification model of duty allocation in system are based on. The school of system designing focuses on the fact that on what ideological attitude the system designing has on system so it can have access to the system causality to find a solution for questions emerged on causality of system.

When talking about the school of system designing, it is about the attitude that is directly effective on all stages and affairs of system designing and their components and functions. The texture of a system is determined on the basis of its school of designing. All the policies and mechanisms in the system, especially the two concepts of system causality (system can respond to what problems) and the system's function with respect to having access to the ultimate goal of the system or the causality of system are totally derived from system designing school.

The school of system designing is the general attitude of system designer on solving the problem. In other words, how the system designer views the problem and by what general model can he/she (The model is usually a mental model emerging on the basis of causality) solve the problem. Therefore, two concepts of attitude on problem and the models of problem solving can be discussed under the subject of designing school. The main differences among systems generally emerge due to their different schools of designing.

A framework needs to utilize a school of designing. The school of framework designing should involve the general principles and attitudes of system creation with respect to accessing the causality of system.

This is true about PMAMUT, with respect to being a framework. By the school of system designing school, we can identify that 1, how PMAMUT defines the resource management element and what policies, attitudes and general ideas does it hold to develop that definition (The fundamental function of PMamut framework). It also signifies the solutions of PMAMUT to access its causality in general attitude. The school of system designing is not an inactive and timely dependent (Time of system designing) affair.

The problem that PMAMUT confronts with, is presenting a framework (general theory) for managing various resources on large scale distributed systems levels without challenges mentioned in chapter two. PMAMUT primarily tries to find its attitude on the problem and find a solution for it. These two concepts help define two fundamental concepts of system (Causality-reasonability of system). Defining the Causality-reasonability of system helps us decide on general solutions of system to achieve the ultimate goal of system and also its entity.

The school of PMAMUT designing elaborates on the issue that resource management element in each system (without considering what the system is aimed for, what problems it is to solve and how it functions) should meet the needs as a separate concept. PMAMUT initially considers each system as a society preceding the concept of being a system.

Regarding PMAMUT viewpoint, the two concepts of society and system are different. In society concept, there is no necessary binding cooperation and interaction to achieve a specific aim (to solve a problem) while the said obligation and necessity in the system is considered as a system definition obligation.

Society is a group of elements that are set together due to various reasonability and thus interact and communicate with each other and their ultimate goal is continuing their existence in the society. Element, as viewed by PMAMUT (In the field of computer systems) is an entity that can meet its own needs. PMAMUT believes that in each society (Regardless of society's entity and the causes of development of society), the defined fundamental elements of society (as an instance in human society the social fundamental element is one human as in computer society the fundamental element equals an independent computer) consistently can meet the needs defined in them using their internal means and mechanisms.

When an element is defined in a society as a fundamental element, then the entity of the element is necessarily is capable of meeting the needs defined inside itself on the basis of any imaginable model and structure.

Various definitions and classifications have been offered for the needs of fundamental element of each society. As an instance, for human as the fundamental element in human society, we see numerous definitions on entity of human needs whereby there are various classifications out of which Maslow's hierarchy may be a well-known example.

PMAMUT believes that any fundamental element can meet its needs by itself unless its abilities, features and internal means can't do so. In simple words, it means that the fundamental element defined in each society should be as an independent element. Studying the societies on human and non-human basis we realize that the attitude of PMAMUT regarding independency in all societies defined to date is correct and the fundamental element in each society is generally defined so as to be independent and meet its needs.

One of the most important differences between PMAMUT's attitude with previous ones regarding societies or the entity of fundamental element needs in each society relates to the concept of needs classification model. As viewed by PMAMUT, the needs defined in a fundamental element of a society (Human in human society and computer in society of distributed systems as an example) are defined in two groups of needs met by inner capabilities of fundamental element (Local needs) and the needs not met by inner capabilities of fundamental element (System needs).

For each group of needs mentioned above (Local needs and system needs) it is possible to present a classification that (as explain in the following) are different in some cases from today's classification of models entity. The difference is caused by the model used by PMAMUT to recognize the need.

Existence of two classes of needs defined for each fundamental element existing in the society helps PMAMUT define the system concept on its basis. As viewed by PMAMUT, as long as there are only local needs inside a fundamental element, the fundamental element does not tend to participate in the system due to its independence entity. Because as viewed by PMAMUT, this is the need formation in a fundamental element in a society that demands a group of elements in a system to participate in it so the needs level of an element lifts up to the level of system needs.

PMAMUT believes that the two concepts of preserving the independency of an element and participation in systems are conceptually contrary to each other. This means that (According to PMAMUT's school) the fundamental element innately tends to stay independent (In any view the tendency to independency has a concept; as an instance from the viewpoint of involving in overall activity the element should set some of its causes in alignment with overall activities and this means changing the entity of the cause.

Regarding security of element, the element is as a management field with unique model of security, but when a fundamental element enters into the phase of meeting the need of system, it should follow different management fields models. PMAMUT, not getting involved in the reasonability why each fundamental element of society tends to stay independent, calls this subject as the innate entity of element's autonomy). Thus, according to PMAMUT's school, the systems' formation reasonability is existence of a concept called the systemic needs that are defined in each fundamental element (or a group of elements).

To have a general conclusion to investigate the attitude (need-society-system) of PMAMUT as one of the most fundamental principles of framework designing (General theory) of PMAMUT's resource management:

A) PMAMUT defines the resource management as a function of need. Regarding the PMAMUT's causality issue, we will discuss that PMamut changes the causality of a system on the basis of concept requirement (or the need as more clearly) and revises the causality of distributed systems on the basis of the concept of needing and it explains that a distributed system can be developed when there is the concept of needing formed in the system.

B) Based on the experienced obtained regarding system designing, the resource management element is the fundamental concept that forms the main framework of system (The system's fundamental texture). A system can never achieve its goal without precisely defining the resource management element. To investigate the objective result of a system's function viewed by a system designer, the objective result is revealed in system's resource management element.

Thus, PMAMUT changes the criterion of defining the resource management element from two concepts of responding resolutions and control (In today's systems) to the concept of need and explains the resource management element is a function of need concept in the system and defining the need in the system's causality and reasonability.

In today's systems, the foundation of resource management element is based on control and developing the responding structures. Resource management element is based on the general definition that says a it should define a set of policies and mechanisms for resource management to access the system's causality based on the system's causes on the basis of implementing two activities of controlling and developing the solutions in the system.

While, PMAMUT describes the resource management element as an element for meeting the needs of the system on the basis of needs levels (The entity of need formation) and says that the resource management element to meet needs in causality and reasonability of the system should be able to take various measures and implement various duties to meet the need.

The most important difference in defining the resource management element between in PMAMUT's and today's systems relates to Need. PMAMUT defines need and bases the operation on two subjects of need and entity. The other operations defined for resource management element in PMAMUT are meant to achieve the two fundamental concepts of need and need's entity.

While, in defining today's resource management element the focus is on management of resources. PMAMUT considers the resources as means and sets the aim of resource management element on the concept of managing the need. However, in today's systems, the resource management element aims at the resource as the aim and tries to manage it so that it can respond to the requests through managing them.

To study the differences between PMAMUT's school with the school of designing in today's systems philosophically, we should note that there are two concepts of resource-request regarding each element of resource management. In today's systems, the resource management element tries to control the request concept and respond to it through managing the resources existing in the system.

Indeed, the axial element for resource management element is the resource element and the aim of resource management is to respond to requests via managing them. PMAMUT tries to manage the need for which it utilizes various means such as the resources.

This is the same universal effect that is the school of framework designing. The concept of need-need entity is the axis of Piyrax's school of framework designing and it considers other definable elements in system as related means to meet the need. While in today's school of framework designing of resource management (if any schools can be considered) the resource is the focus and other elements defined in system are aligned to it and the aim is utilizing the resource.

In other words, the axial element of PMAMUT is the main challenge of the system, therefore all the concepts defined by PMAMUT is to solve this challenge and this enables PMAMUT to define the concepts needed on the basis of this concept, while in today's systems, resource management element (as the axial element) is a means itself that makes resource management element behave and move on the basis of the defined framework and on the basis of the axial element.

The second factor in PMamut attitude is using the theory of identifying the elements on the basis of system thinking theory. Existence of this difference in defining the axial element in PMamut attitude causes the need developing element to have a concept as an independent element. While in today's systems, since the focus is on the resource, need developing element is a function of the model used by system to identify the elements.

In PMAMUT, the need developing element has an independent entity and is deemed as one of the important elements in need developing process and it indicates the need entity. The definition of resource management element in PMAMUT school is designed on the basis of the subject that the needs of the system should be responded. PMAMUT, contrary to many systems that consider a role for the need concept in system to play, focuses on the subject that the need entity makes determining the need and responding to it.

Identification of need entity in PMAMUT school causes all elements that are beneficiary in responding to the need, have an independent entity. Defining the resource management element based on need concept in PMAMUT helps development of a trend called the trend of responding to need in system (Defining the cause of system in PMAMUT is done on the basis of the said trend).

Formation of said trend is implemented regarding the need's entity, thus identification of elements is based on the concept of need. In such a methodology, called the model of recognition of element-determining the role of PMamut, each element in system is defined as an independent element and its role of need development or responding to the need helps recognition of element by PMAMUT.

When PMAMUT considers each element in the system that has played a role in responding to need to developing a need, as an independent element, then each independent element can be defined as a system which functions as a subsystem that is the resource management element of that PMAMUT.

By such definition, first, the overall system is consisted of a set of subsystems defined on the basis of need concept in system. Second, each system (equaling to one element) has reasonability and causality specific to itself. Existence of such specific causality and reasonability of an element makes many rules of resource management in PMAMUT to be designed according to the independency entity of these causalities and reasonability.

Existence of independent subsystems changes the attitude on resources. That is, in PMamut resource management mechanisms and policies (Contrary to mechanisms and policies of resource management element in today's systems) resources are not considered as the elements that should necessarily follow the general policies and mechanisms of system. PMAMUT, contrary to the systems used today, does not use a uniform causality and reasonability.

In PMAMUT each element plays the role of a system with its own causality and reasonability. On the other hand, all the system has the causality and reasonability that is defined on the basis of PMAMUT's school. PMAMUT, to solve various causalities and reasonability and also their challenges with total causality and reasonability of the system, uses a concept called the systems-subsystems.

The concept of need is the common point of all causalities and reasonability defined in system. The causalities and reasonability of each element defined in PMAMUT for PMAMUT's resource management element is on the basis of need concept. Relation among all the causes and causalities of the defined subsystems and the overall system is also defined on the basis of need concept in system-subsystems.

In PMAMUT school, the system's causality is defined on the basis of the need concept, therefore the reasonability of system is a concept that refers to the trend of need's responding structures.

The distributed systems (as the PMamut basic system) have one ultimate goal, just like any other system designed by human, and thus it tries to achieve that goal through a set of elements (constituting the distributed system).

PMAMUT defines a distributed system on the basis of perceiving the definition of distributed traditional systems and its functional entity as: a distributed system is a group of independent and interrelated machines that are capable of communicating abundant quantity of elements through one ground regarding their entity and innate (like the grounds of human society that can communicate a specific number but abundant quantity of people with each other) interrelated to each other and that interact with each other on the basis of timely reasonability of meeting the users' needs regarding the rules of local autonomy.

The need of the user in this system is essentially aligned with achieving the resource that the local manager had not been able to provide due to any reasonability. In other words, existence of a need in one of the elements makes the elements communicate with each other under the PMAMUT theory and its rules so as to meet the need, so that the system "transparently" meets the need at the time of being developed and so that the user simply deems the entire system resources (which have intervened during the responding trend) as the local resources.

Based on this definition, first, there is a concept of need in PMAMUT literature in the distributed system's causality that is the formation factor of the system. The need is formed in the society that is called the initial society of PMAMUT.

Second, in the definition made by PMAMUT for distributed system, all system elements function as one independent element in system, therefore have their own causality and reasonability (PMAMUT is defined within the computer distributed systems and therefore they are the computer elements, thus the causality and reasonability definition of these elements is the same definition of causality and reasonability of computer systems) and on the other hand, each one of these elements are capable of being defined as one system so that the causality definition of this system is different from the definition of functional duty of element in overall system.

Third, existence of need in society (or system) causes the PMAMUT rules of resource management to be considered as the rules of society to meet the need. According to its periodical entity, PMAMUT uses the two words of society and system to describe what is managed.

This is necessary to consider the following two concepts regarding the system causality (What is causality?).

1—The system's causality exists during the entire system's life and its entity cannot be changed or exterminated during system's life.

2—At the time of system creation, the causality of a system is determined and specified by the system creator and during the system life the management element (necessarily a unique element) or the system creator should guarantee the existence and operation of system causality to the system or any other user of the system. Otherwise, the system is called a random system.

In PMamut theory, the resource management element (That is a distributed element) is bound to establish the system's causality. Causality in PMAMUT has two sections. The causality that rules over the period in which there is no need in society and the causality that rules over the period in which a/several needs are formed in society whence the society is turning into a system (or already has turned into a system).

It is sufficient here to end the discussion to the fact that the causality of the distributed system, as regarded by PMamut viewpoint) is a function of time that should constantly be established in both mentioned periods but with different levels of significance coefficient for the system depending on existence or inexistence of need/s in the society.

When no need is formed in society, PMAMUT is not active and thus the causality of the society is the factor that has formed the society. In distributed systems, at the time of lacking of need, society means a set of elements existing on meta-network of internet or in other words a member of meta-network of internet, however when a need is formed the system causality turns into the causality mentioned above.

What is reasonability? The reasonability of PMAMUT regarding the distributed systems is the entity structure of distributed system that interprets and explains the following three issues:

A) What elements in system as the system components are solving problems (needs)?
B) How are the elements or components of system related to each other?
C) Based on the elements specified regarding question A and also the structure obtained in answering to question B, how is the system able to achieve its ultimate goal (causality) of the system?

The reasonability of distributed systems in PMAMUT literature is answering to this question:

How do elements transfer the needs, when formed inside, from local level to distributed social level? what elements can participate in responding structures observing the rules and limits? How are the rules of interactions and communications of beneficiary elements in responding to need? How does the PMAMUT resource management element manage the system to let it meet the causality (That is responding to the need) without involving the user?

Based on what models the PMAMUT resource management system performs the duties of resource management element and based on what concept can it help resource management respond to the need in system without getting involved in challenges mentioned in chapter two (Resource management element in this regard).

Responding to the first question regarding reasonability, we should state that what is the model of recognition-duty allocation in PMAMUT resource management element? PMAMUT uses a special model that is a progressed version of Reductionism-Systematic Model to define the model of element-duty allocation recognition to meet the need.

In this article we call this recognition-duty allocation model as the space of recognition of PMamut in which the emphasis is mainly put on the element recognition based on its role in creating the need and responding to it. In PMAMUT resource management element, the activities and decision making are based on two concepts of need and need entity.

PMAMUT believes that resource management element cannot use the means existing in system to respond to need without recognizing the entity of the entity of the need. Thus, it sets the basis and criterion of decision making to develop the responding trend on the basis of a concept called the entity of the need.

Regarding the system definition based on need and the entity of the need, which is a developed version of two theories of Organization and System, PMAMUT uses a theory called the theory of PMamut Space of Designing to design a system. Accordingly, this is necessary to note that PMAMUT generally defines the system on the basis of the concept of need-need entity.

To recognize the entity of need in the distributed system with the causality and reasonability to be explained in next sections, uses the concept of system thinking, on the other hand it uses the concept of reductionism to recognize the concept of need.

In PMAMUT resource management system, each element and its duty allocation is defined on the basis of the concept of need-need entity. This subject involves three following significant points:

First, PMAMUT defines the concept of causality-reasonability of a system on the basis of the concept of need; that is the traditional definition of distributed and extended systems is defined on the basis of fundamental concept of need when PMAMUT is the element of system management element.

Second, contrary to today's systems which use a multi-layer structure (Each layer with its specific definition and duty allocation, so that each layer has a specific relation with its lower layer and upper layer and where it is demonstrated by a rectangular-cubic symbol) the PMAMUT's structure uses a special architecture called DNA PMamut that is similar to a strand of DNA in space.

Alongside with the DNA strand there are the various levels of architecture of PMAMUT resource management element so as we move along the DNA PMamut strand we observe changes in models of element recognition-duty allocation and also the theories of system designing.

Third, the recognition-duty allocation model of PMamut recognition space is as a function of need. One of the most important differences between PMAMUT and other resource management systems relates to the function of recognition-duty allocation model of the element. In today's other resource management elements, the recognition-duty allocation model is a function of resources, while in PMamut resource management in each level of PMAMUT's architecture or DNA PMamut when every moment a theory dominates on creating the management system, is a function of need-entity concept.

Need is a concept that is directly related to the concept of time and the beneficiary elements of responding to it. In PMamut resource management element, need has a cycle that starts from a concept called PBang X in which X indicates the concept of need and somehow a concept called the overall activity develops throughout the system and is completed by a concept called completing activity.

In PMAMUT, each need should go through a cycle called PMamut Request. In the starting point of the cycle of PMamut Request, a concept called PBang X exists that shows the formation of X need in system and X (based on needs classification, which is derived from resource classification and mainly from a principle of system-subsystems) and by the PMAMUT resource management models in system level (described by a concept called the overall activity) the need changes the executive level and transfers itself from its creating level (Local) to the overall distributed system level and is responded by a concept called the complete activity.

According to FIG. 1, this peer to peer system before PBang X occurs isn't anything except a network. Each system in the network can be a member of a local network or could be an independent unit. Wherein all the policies in this peer to peer system are the same as those in a with network policies. Variety of machines in this peer to peer system is a lot and it isn't necessary that machines present continually.

Machines use different protocols in local networks and use standard protocols to communicate with each other in global network. It's important that all machines in this system are independent and don't need other machines' information in the global network. Note that in FIG. 1 we have eliminated the machines that can't run this peer to peer system.

Figure 2:
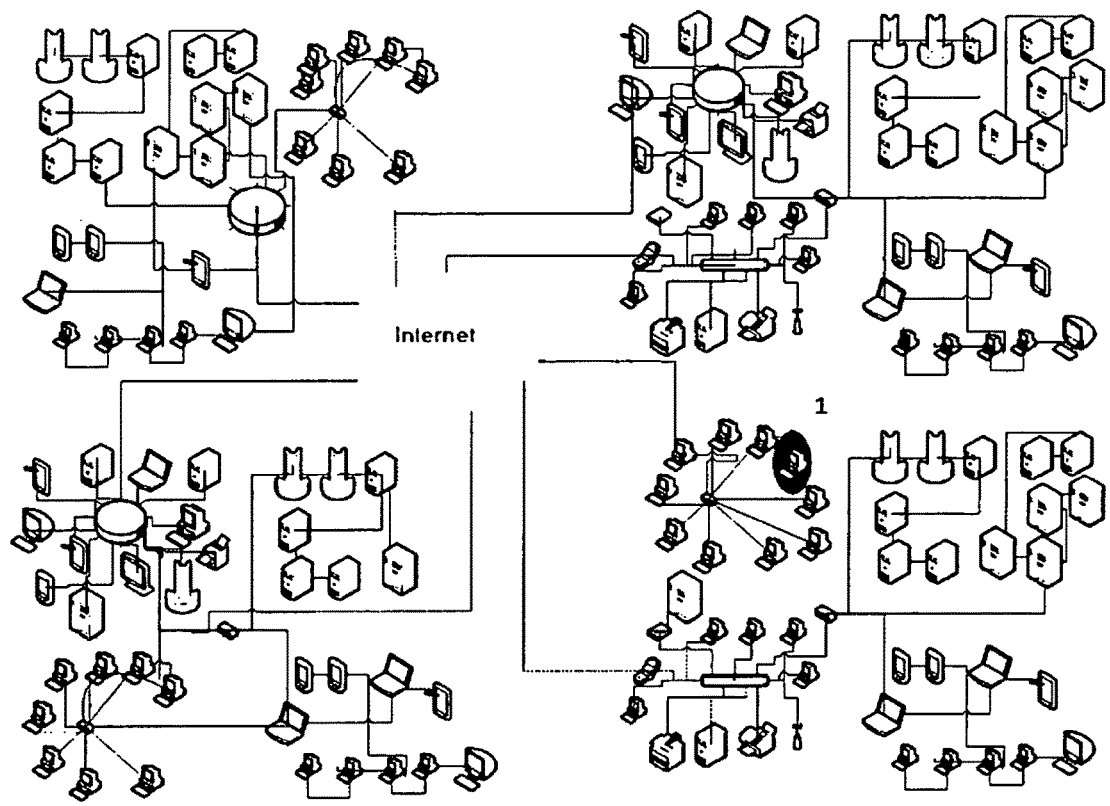
FIG. 2, displays when PBang X occurs (it demonstrate time=$t_0$ in this peer to peer system, specified machine 1 has caused PBang X).

According to FIG. 2, it demonstrates time=$t_0$ in this peer to peer system. The machine that is specified with number 1 in FIG. 2 has caused the PBang X. Therefore a request has occurred in machine 1 wherein the local operating system is not capable of responding to it. When local operating system failed to response to this request, an error occurs and PMamut that is implemented in operating system kernel trigger and doesn't let error signals reach to application or part of operating system that caused the error. In this state operating system change process state (Running, Ready) to a PMamut state.

Figure 3:
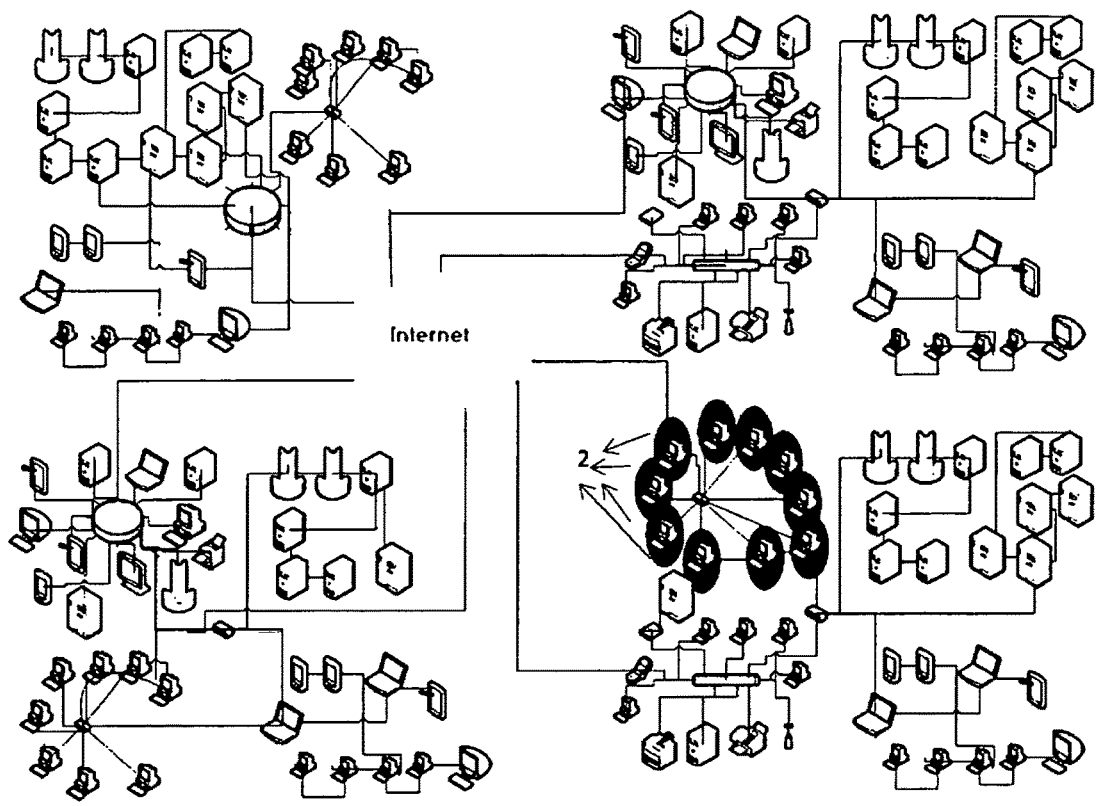
FIG. 3, displays created region I (PMamut units send a message with a network unit time life to all machines 2 in the neighborhood). An Oasis concept in the proposed resource management framework is used to keep the history of resource categorization patterns, using the operations running on the machines.

According to FIG. 3, PMamut units send a message with a network unit time life to all machines 2 in neighborhood. With the message, machine 1 can identify the other machines that have this peer to peer system's Daemon. Machine 1 sets timer for X seconds, where X in each machine 2 is different from other machines 2 and is equal with TTL (Time to Life) average. Practically only the machines that have this peer to peer systems' Daemon can receive this message. Each machine 2 that has this peer to peer system's Daemon after receive this message decreases one unit from the message's network life time or X, the message is killed when X reaches zero.

The machines that its PMamut manager is not active, receives the request and activates it. The PMamut manager in a local machine has a unit for storing information, which has the important role of determining the location of resources in the P2P system.

PMamut uses the information in the proposed PMamut framework to keep the history of resource categorization patterns, using the operations running on the machines. A part of the memory space of each machine in the P2P system is reserved for saving the histories of four categories of resources. The history of access, requests, responding machines, and routines for responding to requests on each of the major resources are kept inside this protected space. In other words, each machine has a special information space for each category of four resources.

At the system startup (i.e. t=0), the P2P manager in the local machine 2 has spaces that are empty. When a resource request cannot be satisfied locally in the machine 1, the P2P manager running on that machine sends a control message to its immediate neighboring machines.

Figure 4A:
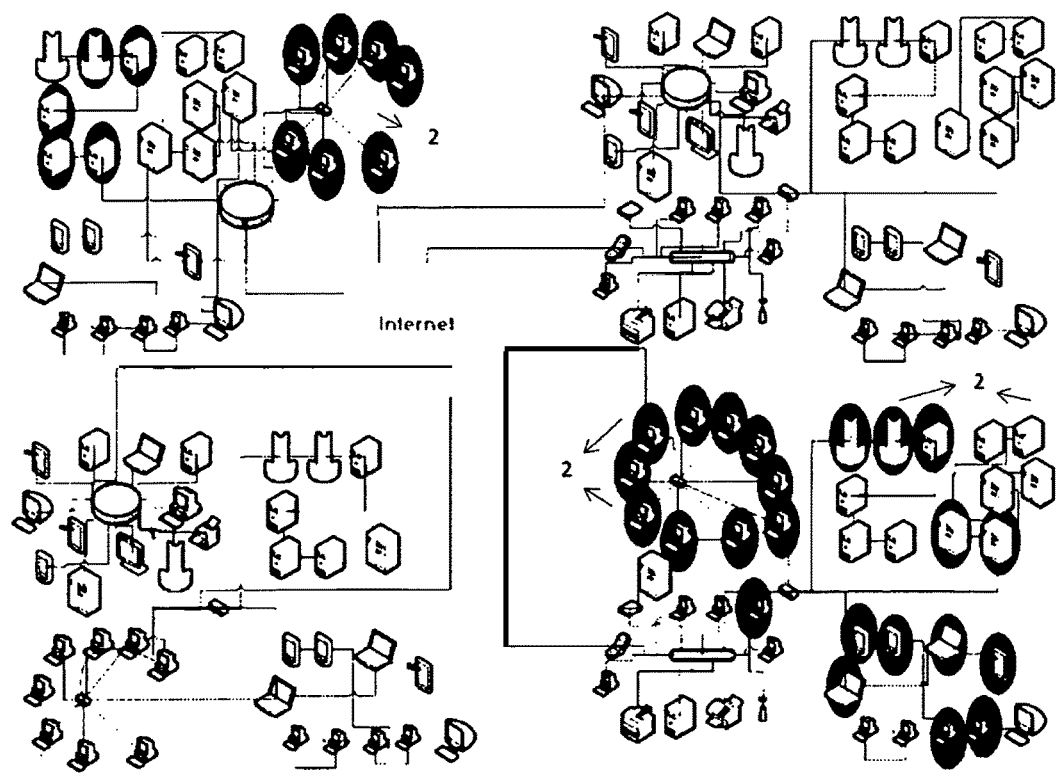
FIGS. 4a, 4b; displays created Region II (when neighboring machines 2 receive this control message, their PMamut managers are activated and check if they have the requested resources).
Figure 4B:
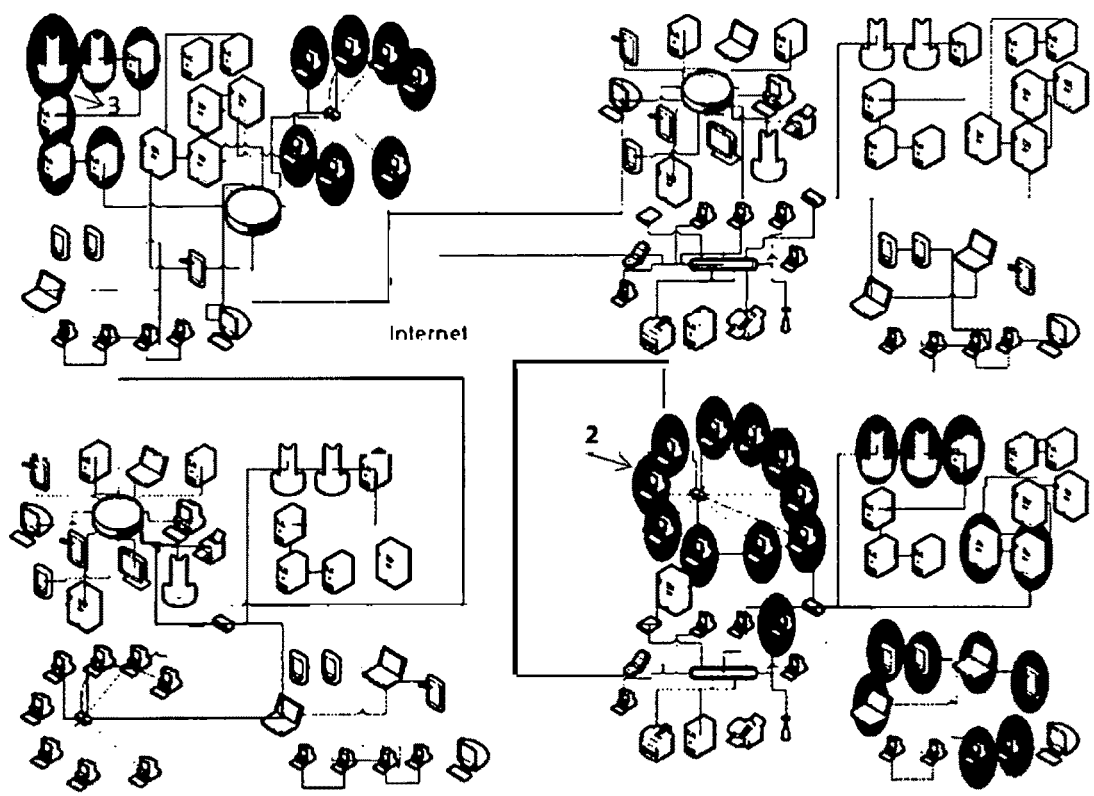

According to FIG. 4, when the neighboring machines 2 receive this control message, their PMamut managers are activated and checked to see if they have the requested resources. If any of the machines 2 in the neighborhood are not capable of providing the requested resources, they pass the requested message to their own immediate neighboring machines as it is shown in FIG. 4. The propagation of the requested messages continues until at least one machine 3 has the requested resources.

Figure 5:
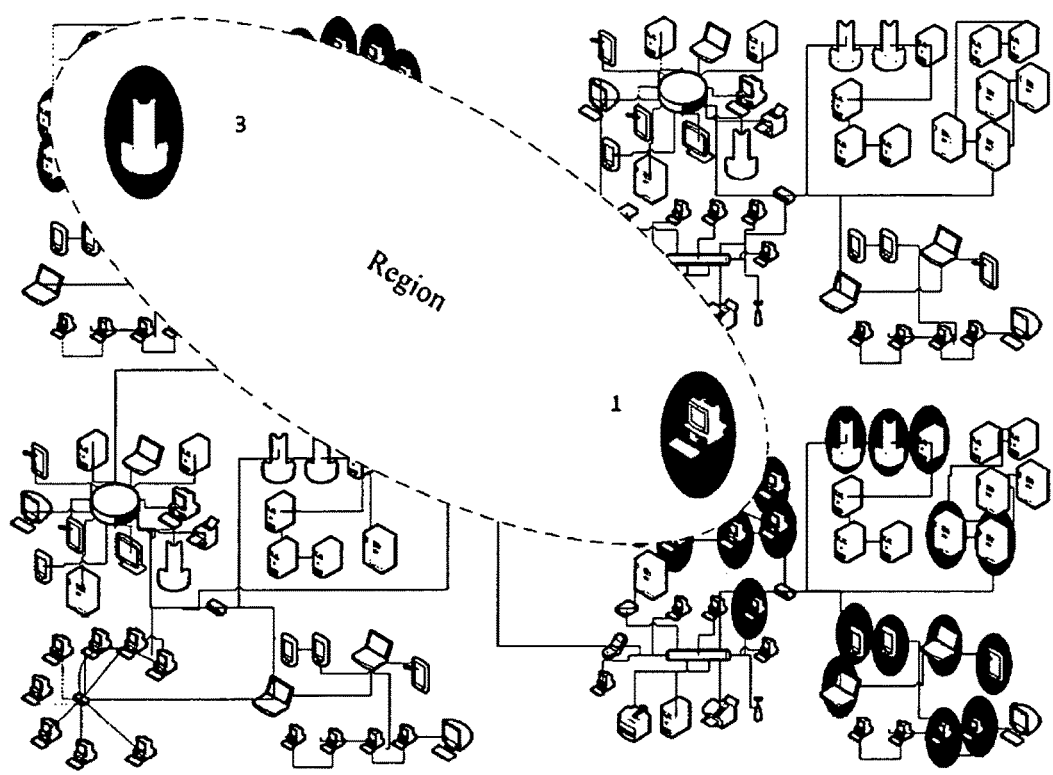
FIG. 5, displays created Region III (at this time, the machine 1 requesting the resource in the first place forms a region with one of the machines 3 that responded to its request).

According to FIG. 5, at this time, the machine 1 requesting the resource in the first place forms a region with one of the machines 3 that responded to its request. Information on respondent machines and kind of their available resources is registered in the information spaces of machines requesting the resources. Each region that is formed has a coordinator that is elected by machines in the region.

Let us now see how the coordinators in regions are elected. Having formed a new group with a remote machine that provides the requested resource, one of the two machines (requester 1 and the chosen respondent 3) is nominated and declared as the coordinator of the group or region. Selection is done through an election that is biased towards the type of requested resource, the capability of machines and the frequency of changes in the requests. Upon arrival of the new requests as it is shown in FIG. 5, the new machines may join existing groups based on the PMamut Membership Rule and each group may reorganize and start electing a new coordinator.

In PMamut Request cycle, the basis of the cycle is the concept of need and the said cycle is created per need defined in system level (Not the needs defined on system elements level). PMAMUT, undertakes the duty of resource management throughout the distributed system and therefore PMamut Request cycle is not executed for the needs defined in each one of the constituting elements of system in which the fundamental elements can respond to it themselves.

This concept is resulted from the definition of local causalities and reasonability for each constituting element of the system that is the main foundation called the system-subsystem principle.

In PMamut Request cycle the need is defined on account of two concepts of beneficiary elements in responding to the need and the time. The need is a concept that the more it moves through time the more its entity changes provided that the beneficiary element in responding exists on the path of timely movement. In other words the concept of need has a strong correlation to the twofold beneficiary function of responding and time.

This is not true in some cases, in the level of some systems we notice needs that are both correlated with time concept independently and correlated to beneficiary elements concept in responding and that are also correlated with both of them as a twofold function.

DNA PMamut is created against each need developed in the system. Meantime, Concept X or the concept of need distinguishes the differences in DNA PMamut. X contains two concepts, first, it indicates the need or the requested element, second, why we need X shows the entity of need. The entity of need is a concept that is kept away from user's direct involvement and comprehension, therefore as observed by users when a request regardless of its type is formed in the system PMAMUT responds to it constantly using a unique model that is DNA PMamut. (A unique procedure to respond to the requests).

DNA PMamut chains are twofold. PMAMUT uses a chain for implementation of a section of resource management that relates need to time and uses another chain for implementation if a section of resource management element that indicates the relation of need to responding elements.

The two chains are not (usually) independent from each other and there is a relation between the two chains and this relation shows the interdependency between the two concepts of time, responding elements with each other on the basis of need-entity of the need. In PMAMUT resource management element, each ring of DNA PMamut chain demonstrates a subsection of a group of sections that should be implemented by PMAMUT resource management element to do its management duty, because PMAMUT creates two chains (totally forming a DNA PMamut) against each overall need developed in distributed system. In each one of the subsections of PMAMUT resource management where need is communicating with time and also the beneficiary elements of responding, a concept called the inter-chain relation.

In PMAMUT's resource management the subsections that perform the duties of PMAMUT resource management are defined on the basis of the need concept. Contrary to today's model of resource management, the subsections that form the PMAMUT resource management element first: are not fixed (Each DNA PMamut is formed against each need specifically and thus some constituting sections of PMAMUT resource management element may not be in DNA PMamut related to a need; determining the subsections of resource management element exist or do not exist in DNA PMamut of a need, is conducted on account of the need entity or X).

Second, defining a subsection in PMAMUT's resource management element is dependent on the need and thus PMAMUT defines the sub-duties of resource management element on the basis of the concept of need. All subsections of PMAMUT's resource management element are defined and created on the basis of a concept called complete overall activity which is redefined from one system to another depending on what subsections are needed to perform the complete overall activity.

Formation of DNA PMamut against each need shows that PMAMUT (Against each overall need in system) creates a flexible and dynamic PMAMUT's resource management element with the need entity so that the resource management element respond to requests on the basis of a unique model because of using a unique structure (Always as viewed by applied program).

PMAMUT creates each DNA PMamut against one request and on the basis of the entity of request or X. If consider each ring of DNA PMamut as a subsection of PMAMUT's resource management element, then PMAMUT (Along this ring) uses the executive model when the need plays the main role in responding process and PMAMUT uses the Descriptive model when the need entity plays the main role in responding. (The space of PMamut designing).

As an instance, in the first level of PMAMUT's resource management element levels in a DNA PMamut, that is called the level of logical decision making in responding procedure, the entity of activities in which the ring is executed, is based on decision making on creating the rest of DNA PMamut subsections.

This ring exists in each structure of the DNA PMamut. In the time sequence of DNA PMamut of this ring takes the duty of decision making on the times when other elements of DNA PMamut are created to respond to need and this ring among the DNA PMamut responding beneficiaries has the duty to create structures needed for responding the requests.

One of the main challenges deemed by PMAMUT on traditional resource management systems, is using the Reductionism model for recognizing the elements-duty allocation of resource management element. In this model the elements are created regarding what roles are played by each element of resource management in managing the resources and performing the two fundamental duties of creating the solutions for responding and controlling affairs. By this viewpoint, Reductionism model creates a structure for resource management element on the basis of duty based/ quasi-activity based model.

In traditional resource management element, creating the resource management element structure is performed in two stages. In first stage which is called the resource management element recognition stage, the entity of resource management element and the duties it performs to achieve the system's goal, is determined. The entity of this stage is innately of duty determination type based on duty based model with a viewpoint on the role of resource management element in entire system.

Based on the kind of management performed by resource management element in system level, the Reductionism model segregates the resource management element into a number of elements (these elements lack the ware relation with each other). Now in order to create the structure of resource management element we notice the presence of a group of elements called the developing elements of resource management element.

In the architecture of resource management element, a number of boxes are created (each representing an element or several elements in some cases) based on the roles of the elements and their duties are recorded. The duties are resulted from the specifications of each element developed as a result of resource management element segregation. Initially, each box is in an abstract condition and only the duty description is determined. After completion of designing the architecture of resource management element, the designer in second stage specifies the relations among the boxes (the symbols of elements resulted from element segregation) to achieve the final goal of resource management element.

In this phase, the model of creating the inter-element communication, is a duty based model. The duty is the general duty of the structure and formation of communication among elements is not duty based but is based on the model of achieving the ultimate duty of the developed system, that's why we use the expression "quasi-duty based".

Existence of the two-stage model for creating the architecture of resource management element in traditional systems demonstrates that:

First, in designing the architecture of resource management element, by the entity of creating the responding structure it is endeavored to establish a one by one correspondence among the elements created from resource management element segregation on the basis of Reductionism model and the architecture developing boxes.

Indeed, the model of creating and describing the elements resulted from segregation of resource management element's duties is totally and objectively used as the model of creating the resource management element structure. Therefore, the Reductionism model of element recognition-duty allocation is the main model of creating the structures of traditional resource management element.

The entity of such method is based on duty (The characteristic of element resulted from the segregation of resource management element) and the existing communication among elements (Or the communicative arrows among symbolic boxes of elements in organizational compositions) is created after initial architecture designing and by the system designers so as to demonstrate the procedure to be performed by the resource management elements to be able to achieve the ultimate goal of resource management element system.

One of the most important challenges of this concept in PMAMUT resource management element is distinguishing between the real and abstract functions. The real function refers to the activities to be performed by an entity defined in system observing the local autonomy in system to play its role in system. This definition is based on the emphasis on the concept called the existence autonomy.

This definition means what roles can be played by an entity defined in a system regardless of designing model (That is created by system designers including the duty based model or activity based model) and how should the existence reasonability of the element be (in abstract consideration and regardless of system)?

On the other hand, the abstract function implies that when the system designer designates a role for an entity in system on the basis of one of the two models (duty based and activity based models) how is this role in the reasonability of the entire system? Segregation of these two concepts signifies whether the definition of existence has been or has not been based on the system? Or is the definition of the system based on the existence? In both traditional models of determining the role of existence in system (duty based and activity based) the level of communications and interactions among components of the elements and the level of elements are separated from each other.

In each one of the two traditional models of creating the structures and organizational compositions, the component is separated into some elements which are not equivalent to each other on the basis of Reductionism model. A page called the separated elements page is created as a result of separation of element on the basis of reductionism model. Then the designer of system, to achieve the ultimate goal of the element in the system, creates a page called the page of operational completion.

In the page of operational completion, depending on the basis of design of element's structural composition, two types of scenarios is imaginable. In first scenario which is used for creating the compositional structure on the basis of duty based model, the operational completion page is set on the separable elements page, and the operational completion page contains arrows that are the symbols of communication and interaction among the elements conducted to achieve the ultimate goal of the element in system.

These arrows show that what elements interact and communicate with each other and how they communicate to enable the management element to perform its entity-based and ultimate goal in the system. The second scenario that is for the time when the model of creating the organizational structures in the element are equal to activity based model, the operational completion page stays on the page of separation elements which first, contains elements which play the role of executive beneficiary of the activity existing in the separated elements page.

Second, these elements have the duty of performing a section of activities defined in separated elements page. The system designer, on the basis of abilities and characteristics of the activity elements existing in the separated elements page and on the basis of characteristics existing in operational completion (Executive elements), determines the places of the elements existing in the operational completion page so as to enable the management element to achieve its ultimate goal.

Investigating the methods of creating the traditional architecture using activity based and duty based methods we realize that:

First: in both methods the communications and interactions among executive elements and separated elements are different from each other and they are considered as two separate entities. And in both scenarios the entities are studied in different abstract phases. Second: the entities of both methods are based on the concept of specifications and capabilities of the elements. This is resulted from the models used in both methods of designing the element's composition structures (regardless of the element's general entity) in the system that is the Reductionism model.

In the model of creating the architecture based on duty based method the only criterion of entity is the executive element feature while the criterion in activity based method is resulted from the entity of executive element feature and activity elements. Therefore, a fundamental challenge in today's architecture designing for elements (or for systems) is the separation of two concepts of communications and interactions from the concept of separated elements.

In the PMAMUT's resource management element, the basis of element is the concept of need and therefore PMAMUT lacks the specific structures for resource management element and thus the system. If we investigate the need, we realize that we cannot decide on the concept of need's entity till the need is created. The entity of need is the main key for creating the architecture of resource management element. Just as we do for any other management element, in order to manage the need and consequently design the architecture for the managing factor of element, we need to precisely understand the need.

Understanding the need requires exploitation and understanding a concept called the need entity. The need entity defined as comprehending the need in related system-environment. The entity of need can only be achieved on the basis of the model of general attitude and investigation. That's why the primary elements if management element uses the model System Thinking in each phase of management in architecture of PMAMUT's resource management element (Cognition method in first half of each ring).

In the world of time reality in which a need is created in a system, if the system uses Reductionism model for recognition of need, it is possible (highly possible) that many aspect of need be ignored because of two concepts of limits and deficit of definition of need in the environment where need is created and also because of a concept called the level of element separation in Reductionism model.

When need entity is separated into a number of elements, some relations among its sections may be wasted and ignored. The precise definition of separation level for each need depends on the need itself and no general rule can be applied for model of separation level. It should also be regarded that need itself is subordinate to two concepts of beneficiaries of responding to need and time.

The entity of two elements of beneficiaries of responding to need and time is dynamic (specially the time entity) and no rule can be defined to separate these two concepts. In economy, management of society's needs is expressed generally. Need is highly interdependent with its crating factors and its responders (This concept is called the beneficiaries of responding to need in PMAMUT's literature) and also the related time limits, so that division of need element into its fundamental elements (to describe a bidirectional relation between the created elements and the initial need) requires determining a concept called the need entity and until the need entity is not exploited and comprehended, the division on the basis of Reductionism destroys the bidirectional relation between need and the elements created therefrom.

PMAMUT avoids creating architecture for resource management element and PMAMUT's resource management element creates a concept called DNA PMamut only against each need developed in system with its first ring called Apollo and it comprehends and analyzes the need in the commencement of the Apollo ring which is developed for a specific need.

A general section of activities formed in Apollo ring, are of System Thinking model type. In Apollo ring, PMAMUT's resource management element tries to determine the entity of need for which DNA PMamut is formed. This will be studied for both branches of Apollo ring which are both the beneficiaries and also the time. The entity of the need developed in Apollo ring causes a unit called PMamut-PTeami decides on what rings should have DNA PMamut for the need.

The PMamut-PTeami unit is a section of Apollo ring which functions on the basis of a mathematical model called PMamut-PTeami. Indeed, contrary to today's resource management element, in PMAMUT's resource management element the resource management element is not created and designed from specific and determined number of elements (Created on the basis of Reductionism model).

The instance of traditional resource management element is the resource management element in cluster systems and Exascale computing that is converted into elements such as load distribution, resource discovery (in some systems of cluster resource management) and migration of process on the basis of Reductionism model. Communications and interactions among the said elements is defined based on the fact that how it is possible to develop relation and interaction among the said elements so as to enable the resource management element to achieve its ultimate goal.

As an instance, since the ultimate goal of management element in today's cluster resource management element is optimal utilization of the central processing resource, then the way of interactions and communications among the constituting elements are aligned with optimal utilization of central processing resource. To achieve this aim in cluster systems, the load distribution elements have direct interaction and communication with the load migration element.

While in PMAMUT's resource management element, first, no concept called the architecture of resource management element exists at the time of creating the system, but the concept called DNA PMamut in PMAMUT's literature indicates the attitude of PMAMUT on architecture. Second, when PMAMUT faces a need in system and creates a DNA PMamut for the need, no architecture is observable for PMamut either.

PMamut architecture is created by PMamut-PTeami unit on the basis of causality and reasonability of PMAMUT's resource management element and at the time of analyzing the need entity for which DNA PMamut is developed.

Therefore, DNA PMamut architecture initially and without analyzing and understanding the entity of the need it is created for, is a two-chain ring (time, beneficiary of responding) called Apollo.

Third, PMamut-PTeami unit which exist in Apollo ring, which resides in Apollo ring, decides on what rings (subsystems defined in PMamut resource management element) should exist in compositional structure of DNA PMamut on the basis of analyzing the need entity for which DNA PMamut is created and on the basis of solving an equation called the Equation of PMamut-PTeami.

One of the important challenges considered by PMAMUT's resource management element about other traditional resource management systems is using the prefabricated structures. Using the prefabricated structures reduces the flexibility of the resource management element with respect to confronting with entity of needs and changes in the needs and on the other hand it is directly effective on scalability.

The concept of using the prefabricated structures in resource management element can be discussed in two general levels. First level that is called the intra-system level is all the activities considered at the time of system designing for resource management element to respond to requests existing in system and controlling the resource management trends. (That is the prefabricated structures). Second level, called the management entity level, is the way of function and architecture of resource management element.

In PMAMUT's resource management element because of the change in resource management system's attitude from resource management to needs management, and the change of concentration of resource management element from resource concept to need concept and need entity and consequently the change of causality-reasonability of system and also its school of designing, makes the concept of prefabricated structures on intra-system level of PMAMUT's resource management element meaningless.

The most important reason of this subject is that the need changing entity is not specific at the time of system designing. In the management level, PMAMUT's resource management element defines the DNA PMamut structure against each need formed in system; therefore, first no prefabricated structure to respond to the need on management level.

From another viewpoint, this means that the mechanism of facing and responding to the need is formed during the system's life. Second, during the designing stage, the only strategy of structure resource management element is specified to meet the need. In PMAMUT, the general strategy of resource management element is based on meeting and facing with the need.

That is resource management element does not take any action until a need emerges (Observing autonomy) and when the need appears in system it responds to the need regarding a concept called the need entity.

In PMAMUT, need is considered to have two-level concept. A section of need has Description entity and another section has executive entity. System Thinking Model is used to recognize the description section of need and thus the System Theory of designing has been used. To recognize the executive entity of need, the Reductionism model and designing theory of Organization is used.

Numerous strategies have been specified in PMAMUT and the strategy/ies used by the resource management element to be able to respond to needs existing in system level (Defined based on the causality and reasonability of PMamut) can be determined during performance.

In architecture of PMAMUT's resource management element, implementation of general strategy of system is a unit called PMamut-PTeami existing in initial ring of Apollo or the first ring of DNA PMamut which during the performance time, using two concepts of need entity and solving the equation of PMamut-PTeami determines the rings related to a need should exist to respond to that need.

Need is a general and extended concept and in real world no structure or organizational composition can be found to manage any need.

In designing a management system that is created only on the basis of need and responding beneficiaries in need, the system should be able to consider various modes of need. This system should be able to create all the possible structures and solutions to respond to need.

This means that designing such system should be able to identify any possible need in system and develop and create all mechanisms, solutions, control structures and more generally anything required to manage and respond to such various range of needs during system's life. However, this is contradictory to the theoretical entity of PMAMUT's resource management in which the prefabricated structures are avoided. Even if such management system is feasible, first, it take too much time to exploit the entire needs during the designing and sometimes impossible.

Second, if such system uses the PMAMUT's resource management theory and thus manages the need at the time of system's life, the managerial structure of performance time of such system will be so complicated and in some cases only the active element in system will be the resource management element.

Indeed, when a need is formed in system, if the management system is merely created on the basis of need (Executive entity) then responding mechanisms should be activated right off. This issue prevents the designer from being able to face the need at the time of performance.

The theory of PMAMUT's resource management during the system designing and to achieve this definition, should be able to perform in any system and to define the general policy of system's resource management on the basis of the need. Mapping the PMAMUT's general policy concept in architecture of PMAMUT's In this section we explain principles of PIRAX resource management theory. Before introducing PIRAX general principles, it's noteworthy that PIRAX is designed and implemented to resolve mentioned challenges regarding resource management in large scale (distributed) extended systems which have capability to execute 21 century's scientific applicable plans (having dynamic feature), so that it will be able to support and resolve all challenges mentioned in chapter 2 as well as providing a suitable solution for each one.

Exact scope of PIRAX is to present a framework for resource management at large scale distributed systems. In PIRAX literature, the concept of distributed scope refers to classic distributed system and utilizes the same definition that is referred to, in distributed systems. In PIRAX, being large scale means extendibility (increasing or decreasing system's elements) in a way that the system can expand itself regardless of sub-layer base in order to access its causes.

Regarding that one of the major examples of nowadays distributed systems is the meta network of internet, so resource management theory is designed and implemented based on the fact that sub-layer base is a substrate like meta network of internet having enormous elements inside. The element is defined just when applied. If the element is mentioned somewhere with no definition, then it refers to machines existing in meta-network of internet.

Existence of disharmonic elements in internet meta-network has no effect on general principles of PIRAX according to the theoretical entity of PMamut پی ماموت resource management, unless when PIRAX wants to utilize the special features of the elements (machines existing in internet meta-network), then the heterogeneous modes supported by PIRAX management theory and the modes not supported thereby will be mentioned.

Other expressions and words used in PIRAX literature is described in details in this section. This is noteworthy that PIRAX is a framework for managing various resources on the distributed large scale systems with characteristics like flexibility and inexistence of prefabricated structures and not needing the server-based structures.

On the basis of the framework entity of PMamut, the PIRAX literature is written on the basis of theories that can be applied to any system (computer and non-computer) that 1: have the challenges mentioned in chapter two, 2—are similar to the system described by PIRAX, so that the general principles of PIRAX are verifiable on them.

The school of system designing means, what theory and model are the system designing theory and element identification model of duty allocation in system are based on. The school of system designing focuses on the fact that on what ideological attitude the system designing has on system so it can have access to the system causality to find a solution for questions emerged on causality of system.

When talking about the school of system designing, it is about the attitude that is directly effective on all stages and affairs of system designing and their components and functions. The texture of a system is determined on the basis of its school of designing. All the policies and mechanisms in the system, especially the two concepts of system causality (system can respond to what problems) and the system's function with respect to having access to the ultimate goal of the system or the causality of system are totally derived from system designing school.

The school of system designing is the general attitude of system designer on solving the problem. In other words, how the system designer views the problem and by what general model can he/she (The model is usually a mental model emerging on the basis of causality) solve the problem. Therefore, two concepts of attitude on problem and the models of problem solving can be discussed under the subject of designing school. The main differences among systems generally emerge due to their different schools of designing.

A framework needs to utilize a school of designing. The school of framework designing should involve the general principles and attitudes of system creation with respect to accessing the causality of system.

This is true about PIRAX, with respect to being a framework. By the school of system designing school, we can identify that 1, how PIRAX defines the resource management element and what policies, attitudes and general ideas does it hold to develop that definition (The fundamental function of PMamut framework). It also signifies the solutions of PIRAX to access its causality in general attitude. The school of system designing is not an inactive and timely dependent (Time of system designing) affair.

The problem that PIRAX confronts with, is presenting a framework (general theory) for managing various resources on large scale distributed systems levels without challenges mentioned in chapter two. PIRAX primarily tries to find its attitude on the problem and find a solution for it. These two concepts help define two fundamental concepts of system (Causality-reasonability of system). Defining the Causality-reasonability of system helps us decide on general solutions of system to achieve the ultimate goal of system and also its entity.

The school of PIRAX designing elaborates on the issue that resource management element in each system (without considering what the system is aimed for, what problems it is to solve and how it functions) should meet the needs as a separate concept.

PIRAX initially considers each system as a society preceding the concept of being a system. Regarding PIRAX viewpoint, the two concepts of society and system are different. In society concept, there is no necessary binding cooperation and interaction to achieve a specific aim (to solve a problem) while the said obligation and necessity in the system is considered as a system definition obligation.

Society is a group of elements that are set together due to various reasonability and thus interact and communicate with each other and their ultimate goal is continuing their existence in the society. Element, as viewed by PIRAX (In the field of computer systems) is an entity that can meet its own needs. PIRAX believes that in each society (Regardless of society's entity and the causes of development of society), the defined fundamental elements of society (as an instance in human society the social fundamental element is one human as in computer society the fundamental element equals an independent computer) consistently can meet the needs defined in them using their internal means and mechanisms.

When an element is defined in a society as a fundamental element, then the entity of the element is necessarily is capable of meeting the needs defined inside itself on the basis of any imaginable model and structure.

Various definitions and classifications have been offered for the needs of fundamental element of each society. As an instance, for human as the fundamental element in human society, we see numerous definitions on entity of human needs whereby there are various classifications out of which Maslow's hierarchy may be a well-known example.

PIRAX believes that any fundamental element can meet its needs by itself unless its abilities, features and internal means can't do so. In simple words, it means that the fundamental element defined in each society should be as an independent element. Studying the societies on human and non-human basis we realize that the attitude of PIRAX regarding independency in all societies defined to date is correct and the fundamental element in each society is generally defined so as to be independent and meet its needs.

One of the most important differences between PIRAX's attitude with previous ones regarding societies or the entity of fundamental element needs in each society relates to the concept of needs classification model. As viewed by PIRAX, the needs defined in a fundamental element of a society (Human in human society and computer in society of distributed systems as an example) are defined in two groups of needs met by inner capabilities of fundamental element (Local needs) and the needs not met by inner capabilities of fundamental element (System needs).

For each group of needs mentioned above (Local needs and system needs) it is possible to present a classification that (as explain in the following) are different in some cases from today's classification of models entity. The difference is caused by the model used by PIRAX to recognize the need.

Existence of two classes of needs defined for each fundamental element existing in the society, helps PIRAX define the system concept on its basis. As viewed by PIRAX, as long as there are only local needs inside a fundamental element, the fundamental element does not tend to participate in the system due to its independence entity. Because as viewed by PIRAX, this is the need formation in a fundamental element in a society that demands a group of elements in a system to participate in it so the needs level of an element lifts up to the level of system needs.

PIRAX believes that the two concepts of preserving the independency of an element and participation in systems are conceptually contrary to each other. This means that (According to PIRAX's school) the fundamental element innately tends to stay independent (In any view the tendency to independency has a concept; as an instance from the viewpoint of involving in overall activity the element should set some of its causes in alignment with overall activities and this means changing the entity of the cause.

Regarding security of element, the element is as a management field with unique model of security, but when a fundamental element enters into the phase of meeting the need of system, it should follow different management fields models. PIRAX, not getting involved in the reasonability why each fundamental element of society tends to stay independent, calls this subject as the innate entity of element's autonomy). Thus, according to PIRAX's school, the systems' formation reasonability is existence of a concept called the systemic needs that are defined in each fundamental element (or a group of elements).

To have a general conclusion to investigate the attitude (need-society-system) of PIRAX as one of the most fundamental principles of framework designing (General theory) of PIRAX's resource management:

A) PIRAX defines the resource management as a function of need. Regarding the PIRAX's causality issue, we will discuss that PMamut changes the causality of a system on the basis of concept requirement (or the need as more clearly) and revises the causality of distributed systems on the basis of the concept of needing and it explains that a distributed system can be developed when there is the concept of needing formed in the system.

B) Based on the experienced obtained regarding system designing, the resource management element is the fundamental concept that forms the main framework of system (The system's fundamental texture). A system can never achieve its goal without precisely defining the resource management element. To investigate the objective result of a system's function viewed by a system designer, the objective result is revealed in system's resource management element.

Thus, PIRAX changes the criterion of defining the resource management element from two concepts of responding resolutions and control (In today's systems) to the concept of need and explains the resource management element is a function of need concept in the system and defining the need in the system's causality and reasonability.

In today's systems, the foundation of resource management element is based on control and developing the responding structures. Resource management element is based on the general definition that says a it should define a set of policies and mechanisms for resource management to access the system's causality based on the system's causes on the basis of implementing two activities of controlling and developing the solutions in the system.

While, PIRAX describes the resource management element as an element for meeting the needs of the system on the basis of needs levels (The entity of need formation) and says that the resource management element to meet needs in causality and reasonability of the system should be able to take various measures and implement various duties to meet the need.

The most important difference in defining the resource management element between in PIRAX's and today's systems relates to Need. PIRAX defines need and bases the operation on two subjects of need and entity. The other operations defined for resource management element in PIRAX are meant to achieve the two fundamental concepts of need and need's entity. While, in defining today's resource management element the focus is on management of resources. PIRAX considers the resources as means and sets the aim of resource management element on the concept of managing the need. However, in today's systems, the resource management element aims at the resource as the aim and tries to manage it so that it can respond to the requests through managing them.

To study the differences between PIRAX's school with the school of designing in today's systems philosophically, we should note that there are two concepts of resource-request regarding each element of resource management. In today's systems, the resource management element tries to control the request concept and respond to it through managing the resources existing in the system.

Indeed, the axial element for resource management element is the resource element and the aim of resource management is to respond to requests via managing them. PIRAX tries to manage the need for which it utilizes various means such as the resources.

This is the same universal effect that is the school of framework designing. The concept of need-need entity is the axis of Piyrax's school of framework designing and it considers other definable elements in system as related means to meet the need. While in today's school of framework designing of resource management (if any schools can be considered) the resource is the focus and other elements defined in system are aligned to it and the aim is utilizing the resource.

In other words, the axial element of PIRAX is the main challenge of the system, therefore all the concepts defined by PIRAX is to solve this challenge and this enables PIRAX to define the concepts needed on the basis of this concept, while in today's systems, resource management element (as the axial element) is a means itself that makes resource management element behave and move on the basis of the defined framework and on the basis of the axial element.

The second factor in PMamut attitude is using the theory of identifying the elements on the basis of system thinking theory. Existence of this difference in defining the axial element in PMamut attitude causes the need developing element to have a concept as an independent element. While in today's systems, since the focus is on the resource, need developing element is a function of the model used by system to identify the elements.

In PIRAX, the need developing element has an independent entity and is deemed as one of the important elements in need developing process and it indicates the need entity. The definition of resource management element in PIRAX school is designed on the basis of the subject that the needs of the system should be responded. PIRAX, contrary to many systems that consider a role for the need concept in system to play, focuses on the subject that the need entity makes determining the need and responding to it.

Identification of need entity in PIRAX school causes all elements that are beneficiary in responding to the need, have an independent entity. Defining the resource management element based on need concept in PIRAX helps development of a trend called the trend of responding to need in system (Defining the cause of system in PIRAX is done on the basis of the said trend).

Formation of said trend is implemented regarding the need's entity, thus identification of elements is based on the concept of need. In such a methodology, called the model of recognition of element-determining the role of PMamut, each element in system is defined as an independent element and its role of need development or responding to the need helps recognition of element by PIRAX.

When PIRAX considers each element in the system that has played a role in responding to need to developing a need, as an independent element, then each independent element can be defined as a system which functions as a subsystem that is the resource management element of that PIRAX.

By such definition, first, the overall system is consisted of a set of subsystems defined on the basis of need concept in system. Second, each system (equaling to one element) has reasonability and causality specific to itself. Existence of such specific causality and reasonability of an element makes many rules of resource management in PIRAX to be designed according to the independency entity of these causalities and reasonability.

Existence of independent subsystems changes the attitude on resources. That is, in PMamut resource management mechanisms and policies (Contrary to mechanisms and policies of resource management element in today's systems) resources are not considered as the elements that should necessarily follow the general policies and mechanisms of system.

PIRAX, contrary to the systems used today, does not use a uniform causality and reasonability. In PIRAX each element plays the role of a system with its own causality and reasonability. On the other hand, all the system has the causality and reasonability that is defined on the basis of PIRAX's school. PIRAX, to solve various causalities and reasonability and also their challenges with total causality and reasonability of the system, uses a concept called the systems-subsystems.

The concept of need is the common point of all causalities and reasonability defined in system. The causalities and reasonability of each element defined in PIRAX for PIRAX's resource management element is on the basis of need concept. Relation among all the causes and causalities of the defined subsystems and the overall system is also defined on the basis of need concept in system-subsystems. In PIRAX school, the system's causality is defined on the basis of the need concept, therefore the reasonability of system is a concept that refers to the trend of need's responding structures.

The distributed systems (as the PMamut basic system) has one ultimate goal, just like any other system designed by human, and thus it tries to achieve that goal through a set of elements (constituting the distributed system).

PIRAX defines a distributed system on the basis of perceiving the definition of distributed traditional systems and its functional entity as: a distributed system is a group of independent and interrelated machines that are capable of communicating abundant quantity of elements through one ground regarding their entity and innate (like the grounds of human society that can communicate a specific number but abundant quantity of people with each other) interrelated to each other and that interact with each other on the basis of timely reasonability of meeting the users' needs regarding the rules of local autonomy.

The need of the user in this system is essentially aligned with achieving the resource that the local manager had not been able to provide due to any reasonability. In other words, existence of a need in one of the elements makes the elements communicate with each other under the PIRAX theory and its rules so as to meet the need, so that the system "transparently" meets the need at the time of being developed and so that the user simply deems the entire system resources (which have intervened during the responding trend) as the local resources.

Based on this definition, first, there is a concept of need in PIRAX literature in the distributed system's causality that is the formation factor of the system. The need is formed in the society that is called the initial society of PIRAX.

Second, in the definition made by PIRAX for distributed system, all system elements function as one independent element in system, therefore have their own causality and reasonability (PIRAX is defined within the computer distributed systems and therefore they are the computer elements, thus the causality and reasonability definition of these elements is the same definition of causality and reasonability of computer systems) and on the other hand, each one of these elements are capable of being defined as one system so that the causality definition of this system is different from the definition of functional duty of element in overall system.

Third, existence of need in society (or system) causes the PIRAX rules of resource management to be considered as the rules of society to meet the need. According to its periodical entity, PIRAX uses the two words of society and system to describe what is managed.

This is necessary to consider the following two concepts regarding the system causality (What is causality?).

3—The system's causality exists during the entire system's life and its entity cannot be changed or exterminated during system's life.

4—At the time of system creation, the causality of a system is determined and specified by the system creator and during the system life the management element (necessarily a unique element) or the system creator should guarantee the existence and operation of system causality to the system or any other user of the system. Otherwise, the system is called a random system.

In PMamut theory, the resource management element (That is a distributed element) is bound to establish the system's causality. Causality in PIRAX has two sections. The causality that rules over the period in which there is no need in society and the causality that rules over the period in which a/several needs are formed in society whence the society is turning into a system (or already has turned into a system). This is sufficient here to end the discussion to the fact that the causality of the distributed system, as regarded by PMamut viewpoint) is a function of time that should constantly be established in both mentioned periods but with different levels of significance coefficient for the system depending on existence or inexistence of need/s in the society.

When no need is formed in society, PIRAX is not active and thus the causality of the society is the factor that has formed the society. In distributed systems, at the time of lacking of need, society means a set of elements existing on meta-network of internet or in other words a member of meta-network of internet, however when a need is formed the system causality turns into the causality mentioned above.

What is reasonability? The reasonability of PIRAX regarding the distributed systems is the entity structure of distributed system that interprets and explains the following three issues:

D) What elements in system as the system components are solving problems (needs)?

E) How are the elements or components of system related to each other?

F) Based on the elements specified regarding question A and also the structure obtained in answering to question B, how is the system able to achieve its ultimate goal (causality) of the system?

The reasonability of distributed systems in PIRAX literature is answering to this question:

How do elements transfer the needs, when formed inside, from local level to distributed social level? what elements can participate in responding structures observing the rules and limits? How are the rules of interactions and communications of beneficiary elements in responding to need? How does the PIRAX resource management element manage the system to let it meet the causality (That is responding to the need) without involving the user?

Based on what models the PIRAX resource management system performs the duties of resource management element and based on what concept can it help resource management respond to the need in system without getting involved in challenges mentioned in chapter two (Resource management element in this regard).

Responding to the first question regarding reasonability, we should state that what is the model of recognition-duty allocation in PIRAX resource management element? PIRAX uses a special model that is a progressed version of Reductionism-Systematic Model to define the model of element-duty allocation recognition to meet the need.

In this article we call this recognition-duty allocation model as the space of recognition of PMamut in which the emphasis is mainly put on the element recognition based on its role in creating the need and responding to it. In PIRAX resource management element, the activities and decision making are based on two concepts of need and need entity.

PIRAX believes that resource management element cannot use the means existing in system to respond to need without recognizing the entity of the entity of the need. Thus, it sets the basis and criterion of decision making to develop the responding trend on the basis of a concept called the entity of the need.

Regarding the system definition based on need and the entity of the need, which is a developed version of two theories of Organization and System, PIRAX uses a theory called the theory of PMamut Space of Designing to design a system. Accordingly, this is necessary to note that PIRAX generally defines the system on the basis of the concept of need-need entity.

To recognize the entity of need in the distributed system with the causality and reasonability to be explained in next sections, uses the concept of system thinking, on the other hand it uses the concept of reductionism to recognize the concept of need.

In PIRAX resource management system, each element and its duty allocation is defined on the basis of the concept of need-need entity. This subject involves three following significant points:

First, PIRAX defines the concept of causality-reasonability of a system on the basis of the concept of need; that is the traditional definition of distributed and extended systems is defined on the basis of fundamental concept of need when PIRAX is the element of system management element.

Second, contrary to today's systems which use a multilayer structure (Each layer with its specific definition and duty allocation, so that each layer has a specific relation with its lower layer and upper layer and where it is demonstrated by a rectangular-cubic symbol) the PIRAX's structure uses a special architecture called DNA PMamut that is similar to a strand of DNA in space.

Alongside with the DNA strand there are the various levels of architecture of PIRAX resource management element so as we move along the DNA PMamut strand we observe changes in models of element recognition-duty allocation and also the theories of system designing. Third, the recognition-duty allocation model of PMamut recognition space is as a function of need.

One of the most important differences between PIRAX and other resource management systems relates to the function of recognition-duty allocation model of the element. In today's other resource management elements, the recognition-duty allocation model is a function of resources, while in PMamut resource management in each level of PIRAX's architecture or DNA PMamut when every moment a theory dominates on creating the management system, is a function of need-entity concept.

Need is a concept that is directly related to the concept of time and the beneficiary elements of responding to it. In PMamut resource management element, need has a cycle that starts from a concept called PBang X in which X indicates the concept of need and somehow a concept called the overall activity develops throughout the system and is completed by a concept called completing activity.

In PIRAX, each need should go through a cycle called PMamut Request. In the starting point of the cycle of PMamut Request, a concept called PBang X exists that shows the formation of X need in system and X (based on needs classification, which is derived from resource classification and mainly from a principle of system-subsystems) and by the PIRAX resource management models in system level (described by a concept called the overall activity) the need changes the executive level and transfers itself from its creating level (Local) to the overall distributed system level and is responded by a concept called the complete activity.

In PMamut Request cycle, the basis of the cycle is the concept of need and the said cycle is created per need defined in system level (Not the needs defined on system elements level). PIRAX, undertakes the duty of resource management throughout the distributed system and therefore PMamut Request cycle is not executed for the needs defined in each one of the constituting elements of system in which the fundamental elements can respond to it themselves.

This concept is resulted from the definition of local causalities and reasonability for each constituting element of the system that is the main foundation called the system-subsystem principle. In PMamut Request cycle the need is defined on account of two concepts of beneficiary elements in responding to the need and the time. The need is a concept that the more it moves through time the more its entity changes provided that the beneficiary element in responding exists on the path of timely movement.

In other words the concept of need has a strong correlation to the twofold beneficiary function of responding and time. This is not true in some cases, in the level of some systems we notice needs that are both correlated with time concept independently and correlated to beneficiary elements concept in responding and that are also correlated with both of them as a twofold function.

DNA PMamut is created against each need developed in the system. Meantime, Concept X or the concept of need distinguishes the differences in DNA PMamut. X contains two concepts, first, it indicates the need or the requested element, second, why we need X shows the entity of need.

The entity of need is a concept that is kept away from user's direct involvement and comprehension, therefore as observed by users when a request regardless of its type is formed in the system PIRAX responds to it constantly using a unique model that is DNA PMamut. (A unique procedure to respond to the requests).

DNA PMamut chains are twofold. PIRAX uses a chain for implementation of a section of resource management that relates need to time and uses another chain for implementation if a section of resource management element that indicates the relation of need to responding elements. The two chains are not (usually) independent from each other and there is a relation between the two chains and this relation shows the interdependency between the two concepts of time, responding elements with each other on the basis of need-entity of the need.

In PIRAX resource management element, each ring of DNA PMamut chain demonstrates a subsection of a group of sections that should be implemented by PIRAX resource management element to do its management duty, because PIRAX creates two chains (totally forming a DNA PMamut) against each overall need developed in distributed system. In each one of the subsections of PIRAX resource management where need is communicating with time and also the beneficiary elements of responding, a concept called the inter-chain relation.

In PIRAX's resource management the subsections that perform the duties of PIRAX resource management are defined on the basis of the need concept. Contrary to today's model of resource management, the subsections that form the PIRAX resource management element first: are not fixed (Each DNA PMamut is formed against each need specifically and thus some constituting sections of PIRAX resource management element may not be in DNA PMamut related to a need; determining the subsections of resource management element exist or do not exist in DNA PMamut of a need, is conducted on account of the need entity or X).

Second, defining a subsection in PIRAX's resource management element is dependent on the need and thus PIRAX defines the sub-duties of resource management element on the basis of the concept of need. All subsections of PIRAX's resource management element are defined and created on the basis of a concept called complete overall activity which is redefined from one system to another depending on what subsections are needed to perform the complete overall activity.

Formation of DNA PMamut against each need shows that PIRAX (Against each overall need in system) creates a flexible and dynamic PIRAX's resource management element with the need entity so that the resource management element respond to requests on the basis of a unique model because of using a unique structure (Always as viewed by applied program). PIRAX creates each DNA PMamut against one request and on the basis of the entity of request or X.

If consider each ring of DNA PMamut as a subsection of PIRAX's resource management element, then PIRAX (Along this ring) uses the executive model when the need plays the main role in responding process and PIRAX uses the Descriptive model when the need entity plays the main role in responding. (The space of PMamut designing).

As an instance, in the first level of PIRAX's resource management element levels in a DNA PMamut, that is called the level of logical decision making in responding procedure, the entity of activities in which the ring is executed, is based on decision making on creating the rest of DNA PMamut subsections. This ring exists in each structure of the DNA PMamut. In the time sequence of DNA PMamut of this ring takes the duty of decision making on the times when other elements of DNA PMamut are created to respond to need and this ring among the DNA PMamut responding beneficiaries has the duty to create structures needed for responding the requests.

One of the main challenges deemed by PIRAX on traditional resource management systems, is using the Reductionism model for recognizing the elements-duty allocation of resource management element. In this model the elements are created regarding what roles are played by each element of resource management in managing the resources and performing the two fundamental duties of creating the solutions for responding and controlling affairs.

By this viewpoint, Reductionism model creates a structure for resource management element on the basis of duty based/quasi-activity based model. In traditional resource management element, creating the resource management element structure is performed in two stages. In first stage which is called the resource management element recognition stage, the entity of resource management element and the duties it performs to achieve the system's goal, is determined.

The entity of this stage is innately of duty determination type based on duty based model with a viewpoint on the role of resource management element in entire system. Based on the kind of management performed by resource management element in system level, the Reductionism model segregates the resource management element into a number of elements (these elements lack the ware relation with each other). Now in order to create the structure of resource management element we notice the presence of a group of elements called the developing elements of resource management element.

In the architecture of resource management element, a number of boxes are created (each representing an element or several elements in some cases) based on the roles of the elements and their duties are recorded. The duties are resulted from the specifications of each element developed as a result of resource management element segregation. Initially, each box is in an abstract condition and only the duty description is determined.

After completion of designing the architecture of resource management element, the designer in second stage specifies the relations among the boxes (the symbols of elements resulted from element segregation) to achieve the final goal of resource management element. In this phase, the model of creating the inter-element communication, is a duty based model. The duty is the general duty of the structure and formation of communication among elements is not duty based but is based on the model of achieving the ultimate duty of the developed system, that's why we use the expression "quasi-duty based".

Existence of the two-stage model for creating the architecture of resource management element in traditional systems demonstrates that:

First, in designing the architecture of resource management element, by the entity of creating the responding structure it is endeavored to establish a one by one correspondence among the elements created from resource management element segregation on the basis of Reductionism model and the architecture developing boxes. Indeed, the model of creating and describing the elements resulted from segregation of resource management element's duties is totally and objectively used as the model of creating the resource management element structure. Therefore, the Reductionism model of element recognition-duty allocation is the main model of creating the structures of traditional resource management element.

The entity of such method is based on duty (The characteristic of element resulted from the segregation of resource management element) and the existing communication among elements (Or the communicative arrows among symbolic boxes of elements in organizational compositions) is created after initial architecture designing and by the system designers so as to demonstrate the procedure to be performed by the resource management elements to be able to achieve the ultimate goal of resource management element system.

One of the most important challenges of this concept in PIRAX resource management element is distinguishing between the real and abstract functions. The real function refers to the activities to be performed by an entity defined in system observing the local autonomy in system to play its role in system.

This definition is based on the emphasis on the concept called the existence autonomy. This definition means what roles can be played by an entity defined in a system regardless of designing model (That is created by system designers including the duty based model or activity based model) and how should the existence reasonability of the element be (in abstract consideration and regardless of system)?

On the other hand, the abstract function implies that when the system designer designates a role for an entity in system on the basis of one of the two models (duty based and activity based models) how is this role in the reasonability of the entire system? Segregation of these two concepts signifies whether the definition of existence has been or has not been based on the system? Or is the definition of the system based on the existence? In both traditional models of determining the role of existence in system (duty based and activity based) the level of communications and interactions among components of the elements and the level of elements are separated from each other.

In each one of the two traditional models of creating the structures and organizational compositions, the component is separated into some elements which are not equivalent to each other on the basis of Reductionism model. A page called the separated elements page is created as a result of separation of element on the basis of reductionism model.

Then the designer of system, to achieve the ultimate goal of the element in the system, creates a page called the page of operational completion. In the page of operational completion, depending on the basis of design of element's structural composition, two types of scenarios is imaginable. In first scenario which is used for creating the compositional structure on the basis of duty based model, the operational completion page is set on the separable elements page, and the operational completion page contains arrows that are the symbols of communication and interaction among the elements conducted to achieve the ultimate goal of the element in system.

These arrows show that what elements interact and communicate with each other and how they communicate to enable the management element to perform its entity-based and ultimate goal in the system. The second scenario that is for the time when the model of creating the organizational structures in the element are equal to activity based model, the operational completion page stays on the page of separation elements which first, contains elements which play the role of executive beneficiary of the activity existing in the separated elements page.

Second, these elements have the duty of performing a section of activities defined in separated elements page. The system designer, on the basis of abilities and characteristics of the activity elements existing in the separated elements page and on the basis of characteristics existing in operational completion (Executive elements), determines the places of the elements existing in the operational completion page so as to enable the management element to achieve its ultimate goal.

Investigating the methods of creating the traditional architecture using activity based and duty based methods we realize that:

First: in both methods the communications and interactions among executive elements and separated elements are different from each other and they are considered as two separate entities. And in both scenarios the entities are studied in different abstract phases.

Second: the entities of both methods are based on the concept of specifications and capabilities of the elements. This is resulted from the models used in both methods of designing the element's composition structures (regardless of the element's general entity) in the system that is the Reductionism model. In the model of creating the architecture based on duty based method the only criterion of entity is the executive element feature while the criterion in activity based method is resulted from the entity of executive element feature and activity elements.

Therefore, a fundamental challenge in today's architecture designing for elements (or for systems) is the separation of two concepts of communications and interactions from the concept of separated elements.

In the PIRAX's resource management element, the basis of element is the concept of need and therefore PIRAX lacks the specific structures for resource management element and thus the system. If we investigate the need, we realize that we cannot decide on the concept of need's entity till the need is created. The entity of need is the main key for creating the architecture of resource management element. Just as we do for any other management element, in order to manage the need and consequently design the architecture for the managing factor of element, we need to precisely understand the need.

Understanding the need requires exploitation and understanding a concept called the need entity. The need entity defined as comprehending the need in related system-environment. The entity of need can only be achieved on the basis of the model of general attitude and investigation.

That's why the primary elements if management element uses the model System Thinking in each phase of management in architecture of PIRAX's resource management element (Cognition method in first half of each ring).

In the world of time reality in which a need is created in a system, if the system uses Reductionism model for recognition of need, it is possible (highly possible) that many aspect of need be ignored because of two concepts of limits and deficit of definition of need in the environment where need is created and also because of a concept called the level of element separation in Reductionism model. When need entity is separated into a number of elements, some relations among its sections may be wasted and ignored.

The precise definition of separation level for each need depends on the need itself and no general rule can be applied for model of separation level. It should also be regarded that need itself is subordinate to two concepts of beneficiaries of responding to need and time. The entity of two elements of beneficiaries of responding to need and time is dynamic (specially the time entity) and no rule can be defined to separate these two concepts.

In economy, management of society's needs is expressed generally. Need is highly interdependent with its crating factors and its responders (This concept is called the beneficiaries of responding to need in PIRAX's literature) and also the related time limits, so that division of need element into its fundamental elements (to describe a bidirectional relation between the created elements and the initial need) requires determining a concept called the need entity and until the need entity is not exploited and comprehended, the division on the basis of Reductionism destroys the bidirectional relation between need and the elements created therefrom.

PIRAX avoids creating architecture for resource management element and PIRAX's resource management element creates a concept called DNA PMamut only against each need developed in system with its first ring called Apollo and it comprehends and analyzes the need in the commencement of the Apollo ring which is developed for a specific need.

A general section of activities formed in Apollo ring, are of System Thinking model type. In Apollo ring, PIRAX's resource management element tries to determine the entity of need for which DNA PMamut is formed. This will be studied for both branches of Apollo ring which are both the beneficiaries and also the time. The entity of the need developed in Apollo ring causes a unit called PMamut-PTeami decides on what rings should have DNA PMamut for the need.

The PMamut-PTeami unit is a section of Apollo ring which functions on the basis of a mathematical model called PMamut-PTeami. Indeed, contrary to today's resource management element, in PIRAX's resource management element the resource management element is not created and designed from specific and determined number of elements (Created on the basis of Reductionism model).

The instance of traditional resource management element is the resource management element in cluster systems and Exascale computing that is converted into elements such as load distribution, resource discovery (in some systems of cluster resource management) and migration of process on the basis of Reductionism model. Communications and interactions among the said elements is defined based on the fact that how it is possible to develop relation and interaction among the said elements so as to enable the resource management element to achieve its ultimate goal.

As an instance, since the ultimate goal of management element in today's cluster resource management element is optimal utilization of the central processing resource, then the way of interactions and communications among the constituting elements are aligned with optimal utilization of central processing resource. To achieve this aim in cluster systems, the load distribution elements have direct interaction and communication with the load migration element.

While in PIRAX's resource management element, first, no concept called the architecture of resource management element exists at the time of creating the system, but the concept called DNA PMamut in PIRAX's literature indicates the attitude of PIRAX on architecture.

Second, when PIRAX faces a need in system and creates a DNA PMamut for the need, no architecture is observable for PMamut either. PMamut architecture is created by PMamut-PTeami unit on the basis of causality and reasonability of PIRAX's resource management element and at the time of analyzing the need entity for which DNA PMamut is developed. Therefore, DNA PMamut architecture initially and without analyzing and understanding the entity of the need it is created for, is a two-chain ring (time, beneficiary of responding) called Apollo.

Third, PMamut-PTeami unit which exist in Apollo ring, which resides in Apollo ring, decides on what rings (subsystems defined in PMamut resource management element) should exist in compositional structure of DNA PMamut on the basis of analyzing the need entity for which DNA PMamut is created and on the basis of solving an equation called the Equation of PMamut-PTeami.

One of the important challenges considered by PIRAX's resource management element about other traditional resource management systems is using the prefabricated structures. Using the prefabricated structures reduces the flexibility of the resource management element with respect to confronting with entity of needs and changes in the needs and on the other hand it is directly effective on scalability.

The concept of using the prefabricated structures in resource management element can be discussed in two general levels. First level that is called the intra-system level is all the activities considered at the time of system designing for resource management element to respond to requests existing in system and controlling the resource management trends. (That is the prefabricated structures). Second level, called the management entity level, is the way of function and architecture of resource management element.

In PIRAX's resource management element because of the change in resource management system's attitude from resource management to needs management, and the change of concentration of resource management element from resource concept to need concept and need entity and consequently the change of causality-reasonability of system and also its school of designing, makes the concept of prefabricated structures on intra-system level of PIRAX's resource management element meaningless. The most important reason of this subject is that the need changing entity is not specific at the time of system designing.

In the management level, PIRAX's resource management element defines the DNA PMamut structure against each need formed in system; therefore, first no prefabricated structure to respond to the need on management level. From another viewpoint, this means that the mechanism of facing and responding to the need is formed during the system's life. Second, during the designing stage, the only strategy of structure resource management element is specified to meet the need.

In PIRAX, the general strategy of resource management element is based on meeting and facing with the need. That is resource management element does not take any action until a need emerges (Observing autonomy) and when the need appears in system it responds to the need regarding a concept called the need entity.

In PIRAX, need is considered to have two-level concept. A section of need has Description entity and another section has executive entity. System Thinking Model is used to recognize the description section of need and thus the System Theory of designing has been used. To recognize the executive entity of need, the Reductionism model and designing theory of Organization is used.

Numerous strategies have been specified in PIRAX and the strategy/ies used by the resource management element to be able to respond to needs existing in system level (Defined based on the causality and reasonability of PMamut) can be determined during performance. In architecture of PIRAX's resource management element, implementation of general strategy of system is a unit called PMamut-PTeami existing in initial ring of Apollo or the first ring of DNA PMamut which during the performance time, using two concepts of need entity and solving the equation of PMamut-PTeami determines the rings related to a need should exist to respond to that need.

Need is a general and extended concept and in real world no structure or organizational composition can be found to manage any need. In designing a management system that is created only on the basis of need and responding beneficiaries in need, the system should be able to consider various modes of need. This system should be able to create all the possible structures and solutions to respond to need. This means that designing such system should be able to identify any possible need in system and develop and create all mechanisms, solutions, control structures and more generally anything required to manage and respond to such various range of needs during system's life.

However, this is contradictory to the theoretical entity of PIRAX's resource management in which the prefabricated structures are avoided. Even if such management system is feasible, first, it take too much time to exploit the entire needs during the designing and sometimes impossible. Second, if such system uses the PIRAX's resource management theory and thus manages the need at the time of system's life, the managerial structure of performance time of such system will be so complicated and in some cases only the active element in system will be the resource management element.

Indeed, when a need is formed in system, if the management system is merely created on the basis of need (Executive entity) then responding mechanisms should be activated right off. This issue prevents the designer from being able to face the need at the time of performance.

The theory of PIRAX's resource management during the system designing and to achieve this definition, should be able to perform in any system and to define the general policy of system's resource management on the basis of the need. Mapping the PIRAX's general policy concept in architecture of resource management element in Apollo ring and PMamut-PTeami unit are the concepts that enable PMAMUT to use need concept for resource management on system level and thus can solve the challenges resulted from today's prefabricated structures in systems. PMamut-PTeami is bound to exploit the need entity through analyzing the need in two levels of beneficiaries in responding to need and the time.

Using the need entity is the lost key for the problem when a system of resource management does not utilize the prefabricated structures and functions on the basis of a concept called the need and on the other hand does not want to determine the needs at the time of system designing. Existence of Description entity provides the possibility for PMAMUT's resource management element to do the works of responding in designing stage, at the time of performance.

Today's resource management systems are designed on the basis of Organization theory. The entity of this theory demands the recognition and determination of the element's application in system to be done only through Reductionism model. Organization theory, in order to perform its two main duties of Prediction and Control, needs to use elements which are used on system's executive level.

When an element is in its initial and primary state (That is an element is not divided into a number of elements which are usable on performance level) is not commonly utilizable in Organization theory because the element is a general entity and cannot be used in one of fundamental duties of either Prediction or Control.

This is inevitable in real world. The elements or concepts that cannot be used to achieve the general theory of the system (Causality or in some cases the reasonability) are deemed to be useless and waste elements or concepts. The need entity is basically a Description concept while the two main classes of activities which should be performed in the systems designed by Organization theory, have an entity of activity type on performance level.

In levels of systems (including decision making or performance) that are designed on the basis of Organization theory, the activities performed for solutions and system control are of performance activity type. The entity of these activities is understandable and recognizable for the executers (agents) in the system. Activities of Prediction and Control type are used on executive level. While Description-type activities are of decision making type activities.

The systems designed on the basis of organization theory cannot usually use Description type activities because they are designed and implemented on executive level. The need entity (first) is an inseparable concept. In other words, Reductionism model cannot be used for recognizing the need entity concept. (Primarily this concept cannot be recognized in system and thus the concept cannot be defined and used in the system).

Even if (supposedly) Reductionism model is used for recognizing the need entity and for determining the application of the concept in system, this concept (As regarded by such systems) is considered as useless and waste in system level because it cannot be used in either general classes of duties in systems designed on the basis of Organization theory (The two main duties of Prediction and Control).

Although within recent years some activities have been performed in resource management systems to utilize the behavioral analytical model (one of the sub-activities used in analyzing the need entity), this is necessary to note that such activities insist on being able to provide capabilities (By the entire repetitive activities existing on system level) to improve the activities for responding to the needs. In analyzing the behavior they try (by applying methods like repetitive performance of program or the way programs access to the resources) to exploit a model based on which the beneficiary unit/s (Regarding the responding solutions) can reduce the time-expense of responding structure through changing the system order (changing the arrows of communications and interactions among the elements and changing the path of responding structure so as to use elements that can reduce the time-expense of responding structure).

Most behavioral analytical models are based on exploitation of entities of activities existing in system and using the statistical methods or artificial intelligence. We can realize through a second investigation on the mission of behavioral analytical models that first, the models are deemed as a section of solution development units in system.

Second, they have executive entity and are utilized on executive level, while the need entity concept tries to identify the causality and reasonability of need by which it can change the structure of resource management at the time of system performance.

The need entity concept does not intervene in executive level under no condition and it cannot be mapped on executive level because we need to use the organization theory in each system (regardless of the theory used by the system). Through need entity we try to find the causality and reasonability of the need to identify the responding structure of the entity being analyzed using a concept called the System-Subsystem.

The need entity demonstrates the reason why the need is formed (In PMAMUT's literature the need entity causality is called PBang X concept) and on the other hand it shows the reasonability of a need. The causality and reasonability of needs are implicit concepts. Need cannot independently describe its causality and reasonability. The need entity is the describer of causality and reasonability of the need. In other words, this is the need entity that describes the cause of need formation (A concept that cannot be noticed in the need) and the way to respond to the need. In PMAMUT's literature, the need entity is referred to as a threefold form (causality of need, reasonability of need and the limits dominating on the time and place space of the need). The causality and reasonability in nature have Description entity. Regarding the need and its causality and reasonability the existence entity describer shows the reason of need formation and the way to respond to it.

The time and place space of need implies the time and place space in which the need is formed during its life and how the place and time life cycle is. Indeed, the limits of the need regarding time and place is determined in this space. When there is a need is introduced in system level (Or more clearly on society's level) necessarily an element in society's level that has place and time limits (Called the beneficiary element) should respond to the need.

If (Supposedly) the responding beneficiary element lack a view on the need and wants to meet the need existing in the system, it should first exploit some information about the need (that is called the need entity in PMAMUT's literature). One of the most important differences in the systems (in which the responding element does or does not use the prefabricated structures) relies in the data exploitation of need or need concept.

Information exploitation regarding the need by the said element should be so that the element can respond to the need. On the other hand the data accumulation by the element should not challenge the time and place limits of responding. There are two general solutions for data exploitation regarding the need.

First method called the specific need entity discovery method in which all the features, limits, abilities and weaknesses of the need compared to the system (Or society) are exploited. To do so, the need responding element should be able to have a precise recognition or discovery regarding the need entity (Based on the need). The most important characteristic of this method is the precise exploitation of need's information.

In this method the need is considered as an object and the positive points, opportunities, weaknesses and threats and generally the features and specifications of the need relative to the society's space are exploited. Obviously, this methodology helps the responding element use the entire information obtained from mapping the opportunity, threats, weaknesses and positive points of the need relative to the society's space to select the best method to respond to the need.

In this method, first the responding element should have a precise view on the society's space and should have complete information about the specifications of the society. Second, it should be able to describe and exploit a set of indexes called the need's status indexes compare to the society. Third, based on the entire indexes of the need's status and also the need's information it should exploit the matrix of weaknesses, threats, advantages and opportunities of the need compared to society.

In this method, the need is considered as an existence, the SWOT matrix of which should be exploited relative to the society's fundamental space and based on the SWOT matrix of the need relative to the society the optimum method of responding to the need is decided upon. The most important challenge in this method is complexity of implementation and the time. On the other hand, as viewed by the responding element, the element should exploit the information for each need.

The method used by PMAMUT's resource management element is called the PMamut-PTeami. In this method, regarding the society's entity and the type of system's causality, the spaces that generate the need entity are exploited and it is endeavored to exploit the need entities on account of the society's fundamental elements by comparing the need entity generating spaces and the society's (Or system's) fundamental elements space.

The most important advantage of this method is based on public definition of need entity generating spaces. The need entity generating public spaces are spaces by which regarding all the needs it is possible to exploit the needs entities. These spaces are not defined on account of special needs and any kind of need leads in development of an element called need entity. On the other hand in PMamut-PTeami method it is possible to define a space called the fundamental element generating space for each society so that the space involves the fundamental elements and concepts (whatever the society is defined based on it) and thus defines the society.

In PMamut-PTeami method, each society (or system) is defined as a several-part (more than twofold at least) and the need concept is deemed as one of the pillars of causality and reasonability definition of such society (system). By defining the two said spaces when we want to study the entity of need in society's level, we just need to define a function/s based on which we can map the need entity space elements to the society's fundamental elements generating space elements.

In this spatial mapping, first, the mapping process exploits what elements is the need entity depend on. Second, what elements are responding to the need entity in society's level (Or what elements in society's level are using the need entities elements). This is also important to note that exploitation of need entity is a time consuming and costly affair. In PMamut-PTeami method we endeavor to, against direct exploitation of need entity, through mapping the need entity generating space element—against each specific need—to the society's generating space—against a specific system).

First: determine the entity of the need, second: what elements in society's level are using the need entity generating space elements.

We initially need to exploit the need entity generating space in PMamut-PTeami, so we continue the scenario of exploiting the need entity by the responding element in system. The responding element in general condition, to exploit the related need entity, needs to know the reason why the need is created in system level? Need is always formed due to lack of an element or a concept in an object.

On the other hand a need can occur in a condition in which element has a classification of needs and meeting a need in the element leads in creation of another need in the element. Anyway, the causality of need is that the requested element is necessary for the survival of the needer (person who creates needs) or performing an activity in system, however it is not accessible to the needer.

In PMAMUT's literature this subject is called PBang X which shows that need X is created in the related element so that it cannot survive in system without responding to the need. On the other hand, each need has a causality, and the causality of need is an affair attributed to the functional entity of the need. The reasonability of the need in PMamut creates the reasonability of DNA PMamut and consequently the reasonability of request architecture in the resource management element which should respond to the need.

Reasonability of the need implies the need is formed of what elements (In DNA PMamut literature this means that what elements should we have in system to respond to need), what communications and interactions exist among the elements of the need (How should the architecture be and how should the elements interact and communicate with each other, more specifically in PMAMUT's literature it shows the concept of complete activity) so that the need can show its causality (In DNA PMamut it shows that how architecture of responding system can respond to the need in system).

On the other hand the need has limits both regarding the time and place. Second, it cannot be responded in any course of time and place and third, it cannot be responded within any time and place. Therefore, the need entity generating space which helps recognition of need in PMamut-PTeami is a three dimensional space which involves the need's causality, reasonability, and time limits and place.

In some systems, to exploit the need information, an element called the need initiator is considered too and this is usually stated that there is "the limit of initiator in exploiting the information". In these systems, the responding element in system, regarding the means by which it should respond to the need, has two modes, first, it has dominance on the means (whether the dominance is granted to the responding element at the time of system designing or is it obtained during the time of responding element's life), second, the responding element with respect to the means, is the only executor of need information exploitation in such a system and the duty of responding to the need is performed by another element.

Regarding the initiator limit entity of the request and the consequences of the limit of request initiator in system and how the traditional resource management element faces this concept and what are the consequences of the traditional resource management element confrontation model and also the way of confrontation of PMAMUT with the request's initiator limit concept and also the entity of differentiation of two analyzing elements and executives will be discussed in next sections.

Another noteworthy point is when are the function of mapping the need entity generating space to society's generating space calculated? If the we overview the need generating space, we realize that there is a generating subspace called time and place space in the need's entity generating space. The time and place subspace to the limits and the needs takes place within the time and place.

The elements of time and place subspace emphasize three factors, first, how should the time and place characteristic so that the need can be formed. Second, how are the limits dominating on time and place limit of responding, in what place and time conditions can the need be met so that the need cycle is completed. Existence of place and time subspaces in need is an important factor in determining in what condition should the need generating space be mapped to the society's generating space.

If we suppose in a system with PMAMUT resource management element, at the time of $t=t_0$ a need is developed in system and DNA PMamut is formed against that need and it has calculated the function PMamut-PTeami in Apollo ring. Commencement of calculation of PMamut-PTeami function means that suitable conditions had existed in place and time subspace for development of the need in related element). PMamut-PTeami unit initially calculates the PMamut-PTeami function to map the generating space of need entity (against which DNA PMamut is formed) to the space of system generating space (with PMAMUT as the resource management element).

The above mapping results in creation of DNA PMamut rings and the units which should exist in DNA PMamut to respond to the need are specified. Now, Supposing that the time and place subspace of need entity generator naturally has not change until results are obtained from calculation of PMamut-PTeami function for the subspace to the time $t=t_n$ (So PMamut-PTeami continues its activity), then the PMamut-PTeami unit does not appear in other rings.

The reason is that in mapping the need entity generating space to the system generating space in Apollo ring, the result of mapping can meet the time and place needs during the responding to need in system. As mentioned in PMAMUT literature, the need has a fixed time and place entity.

Another important factor in the need entity generating space relates to reasonability. If at the time of $t=t_0$ and after execution of PMamut-PTeami function and the result of mapping the two need entity generating space to the system's fundamental element generating space, the reasonability of the need (In every one of its threefold aspects) is not changed until $t=t_n$, then the result of said mapping can meet all the conditions of reasonability during the time of responding to need in system.

Such condition in PMAMUT literature means that the need is of a static entity. This is important to note that in PMAMUT's resource management element the condition with variable causality subspace is ignored (due to being highly complicated). Therefore, whenever the limits on need place and time change or the need reasonability changes, the PMamut-PTeami unit is calculated that is the result of calculation of mapping the need entity generating space to the society's fundamental elements generating space. PMamut-PTeami is a unit in PMAMUT that provides the possibility of executing the programs that have dynamic entity.

The PMamut-PTeami unit appears in commencement of each ring and investigates whether the reasonability or the time and place limits on the need or both of them have changed or not. If so, it changes the ring name to Apollo and remaps the need entity generating space to the society's fundamental element generating space to obtain the next units of DNA PMamut. Here two points are noteworthy: first, DNA PMamut is the same initial DNA PMamut. Second, the next units or their order may change. If PMamut-PTeami realizes that the reasonability or the time and place limits of need are changed in any intersection of two rings, it changes the strategy of confronting with need.

The Concept of Dynamic Entity on the Basis of Need Entity Generating Space

Existence of dynamic entity and the dynamic nature of $21^{st}$ century's problems cause the time and place subspace of need have variable behaviors during the time. When a problem (for which the system is created) is of dynamic type, the program's needs entity constantly change during its life on system (Especially against execution of each activity on it so that the sub-needs of the need are responded).

Clearly, the changes in need during the time are effective on need entity and its generating space too. Changes occurred in the need's entity causes the dynamic entity. On the other hand, change in need entity is the change in need generating spaces. The complexity of need entity increases depending on which one of the need entity generating subspaces are more effective on Creating the dynamic entity and what percentage of the need dynamic entity is created by each one. In utmost complex condition of dynamic entity, subspaces of the causality change from being fixed and has variations. In most problems we face, the existence entity of needs created by problem is always fixed (This fixed condition is the existence entity of the problem and lets us use some rules to solve the problem emerged in a field and which exist when problem and need are expressed). This is complicated to recognize the need causality change and is not included in this article.

The reasonability of a need (which is constituted from three subspaces of need elements, the relation among the need elements and the way of interaction and communication among the agents of need which helps us analyze the need, and against which the responding elements are created, relation among the responding elements and that how through relation and interaction among the responding elements we can respond to the need) may have a dynamic entity.

This dynamic feature in $21^{St}$ century problems and consequently in their needs creates a concept called the dynamic concept of problem. If the elements of need (equivalent to the concept of responding elements) or communication among the need elements (equivalent with the communication concept among the responding elements) and that how these elements cause achievement of need causality through existing communication, change during the execution time of need in system, then need has dynamic entity.

On the other hand, the time and place space which involves three subspaces of commencement, execution and completion may change during the time. If the changes in time and place limit subspaces during the need execution life is in the way that each phase of need execution depends on its previous phase and changes according to its execution way, then the need has dynamic model. If the changes existing in time and place limit subspaces during the need execution life are in the way that each phase of need execution is not dependent on its previous phase and does not change on the basis of its execution, then the need has dynamic entity.

In $21^{st}$ century problems, usually two place and time subspaces (Specially regarding the time and place limits of execution) and the reasonability (Specially regarding the elements of need and communication and their interactions with each other) have dynamic entity and change during the life of need in system. Now, the significant question is that what rings in addition to the Apollo ring should PMamut-Pteami unit be activated?

It is noteworthy that first, the need entity generating space is a Description space, second, the concept of mapping the need entity generating space to the system fundamental elements generating space is a description concept too. Therefore, we expect PMamut-Pteami unit to appear in description section of each ring. When an activity is conducted on need by PMAMUT's resource management element, the activity is of atomic mode in relation to the need, because the activity is conducted in executive section of each ring and the input of executive section of each ring contains the information obtained in Description section. Therefore, the executive activity performed on need completely conforms to the need entity.

Regarding the starting limit, this should be regarded in data exploitation that when a need has an entity that does not need to return to initiator element during the need responding, then the initiator limit in system naturally has no value and significance. The need formed in need initiator is of such a nature that the need responding cycle is not important for the initiator and only the result of need is important for it.

This subject can be studied in two modes. First mode: is the mode in which the need initiator somehow defines the need (limits, characteristics) so the possibility of presenting the response from system responder to the need is only one answer; in such condition the need entity is of Strict type. When a need has strict type entity, first, exploitation of characteristics and entity of need for the responding system is easy, because the need creator should clarify the causality-reasonability and also the place and time space limits of its need.

Second, the responding system of the need has little flexibility. Generally, the need entity concept is an implicit affair and of description nature which in strict needs is converted clearly by the need initiator. In other words the trend that should be executed by the analyzing element of need entity in system, is performed by the need initiator.

Second mode occurs when system has a feature called Full Transparency. In such systems, the analyzer unit designates itself a long time of responding to need to be able to have access to the nee analysis as the need entity concept and presents the need entity as the real need of the requester (In strict condition) to the responding system. In full transparency systems, the structure of need analyzer element is complicated. In such a system, after completion of operation related to the analysis of need by the analyzer unit (conducted in a phases called the system's preparedness phase to respond to need), the need acts as a strict need for the responding system and practically no phase will exist as the need analysis phase.

What we mean from returning to the need initiator, is during the time of responding to need, there are either information about the responding to need so only the initiator can respond to them, or a section of need responding trend demands only the initiator to respond to the need. Second section refers to an important factor. The responding model or the entity of need may change during the responding trend, in a way that it needs to return back to the need creator element and in this regard no other element can play the role of need creator element.

In PMAMUT's literature this returning is called the executive return and this is explained that the reasonability of need entity or the time and place space of need entity are in a condition that this is necessary to return back to the time and place space condition of need initiator to complete the responding cycle.

In need responding systems, with the need initiator limit, there is usually one mapping exists from place and time space of execution to the need initiator time and place space. In PMAMUT, the concept of Successor is formed on the basis of existence or inexistence of this mapping.

In the scenario used by traditional resource management element to respond to request, it is noticed that the entity and basis of process exists in need creator and when a process has access to the system level, it considers the resource as a means by which one or several stages of process requests are responded. However, the resource management element either does not consider the entity and nature of the process requester in the initiator (and offers the resource only on the basis of process requests and general policies of the system) or (It occurs rarely in traditional systems) it only studies the cause of using the process from the requested resource in a specific phase when the process requests accessing to a specific resource (under the general policies of the system and usually to execute the control mechanisms).

In either conditions, the resource management element does not usually exploit the process need entity. In such condition:

A: As viewed by the resource management element, there is no concept called the general request of process. If we take a precise look from point of view of a third observer to the system trend, we realize that the resource management element since the time of request formation in process till the completion of process request (Whether the request is responded or not) is active only when the process request accessing to a resource in system level, and the related activity finishes immediately when the resource is granted to the process.

B: The entity of creating and designing the resource management element on the basis of resource concept, as viewed by the resource management element, the process is meaningful when it has access to a resource.

C: The need entity exists in its initiating element. The initiating element of need has complete schema about the need entity. The general schema of need should not be confused with general schema of functional entity of requesting element. These two concepts are different from each other. When the request is created in the phase of requesting element's life, the requesting element knows about it and knows what is requested.

This general request, to be responded, can be divided into one or several requests. If it is as one request, then a section of it that is accessing to a resource (This section in PMAMUT literature may be called the time and place space of request entity, because it indicates what place and time limits should the need be responded by, however the causality and reasonability of request remains in the requesting element) is transferred from the requesting element to the resource management element. If the general request is divided in several other requests, in each phase only one section of place and time space of request is transferred from the requesting element to the resource management element.

Regardless of how many sections the general request is divided into, resource management element is not aware of the general schema of the request. This is initially because the entity of resource management element designing in traditional systems.

G) When the entity and basis of request is not studied by the traditional resource management element, the concept of executive return to the requesting element become inevitable. A request (Or need as mentioned in PMAMUT's literature) in a threefold in its entity (causality, reasonability, and time and place space). In traditional resource management element when request is transferred from the requesting element to the resource management element, only a section of place and time space (which is related to the time and place limits of the request) is transferred to the resource management element.

Clearly, when the request in system level is using a resource, it should be referred to an element that has information about the nature and foundation of request (causality and reasonability of request) and in case the request has dynamic entity the condition deteriorates and thus the executive returning should be repeated.

H) As viewed by a third observer, in the traditional resource management element, if a timeline is exploited for resource management element regarding a specific request so the timeline shows the times of resource management element's activities in responding trend to the request, then the timeline will have a separation entity. In PMamut's resource management element due to the designing entity and the central element of designing which is based on need, we observe a timeline with junction entity.

To express the responding scenario to the requests mentioned about today's resource management element for PMAMUT's resource management element, then the PMAMUT's resource management element is activated immediately when a need develops in system level and creation a concept called the PBang X (where X shows the causality of need creation). PMAMUT in its first executive phase uses a concept called the PMamut-PTeami to exploit a threefold of need entity (causality, reasonability and time and place space).

Based on threefold exploitation of need entity, PMAMUT defines the active units in DNA PMamut and it responds to the need in system level on the basis of concepts such as (place and time space), state, (causality), System-Subsystem, Leader, Federal (Reasonability) and on the basis of a concept called its successor as the beneficiary of the need.

By this approach, first, PMAMUT is activated during the whole time of responding to the system. Second, PMAMUT undertakes the responding trend. The concept of successor is one of the fundamental concepts of PMAMUT's resource management element and it means that the resource management element undertakes the successor's duty of responding to the need after exploitation of need entity.

PMAMUT, using the successor concept, is able to change its presence time in system from separation mode to junction mode and also to reduce the executive return in system, although in some cases according to the system-subsystem theory the executive return is inevitable but in PMAMUT the successor concept increases the flexibility of resource management element by reducing the executive return and indeed PMAMUT is equipped with the capability of "safe-tuning". The concept of flexibility is used because PMAMUT does not exploit the need entity in one phase and does not create strict need in system.

The differentiation factor between the two concepts of analyzer and executive of resource management emphasizes on the fact that whether the two elements that analyze the request's entity and management of resources should be separated from each other? Or should they be implemented in one unit? In today's resource management element there is no concept called the analyzer of request entity and the said issue is a conceptual discussion and the system designer has considered it on an abstract viewpoint at the time of designing.

The request analyzer should be able to exploit the threefold of need entity from analysis of request. In case the responding system designing is good enough to be able to create the needs and respond to the strict requests, then (to be able to separate the complexities related to the analyzer element from the managing element of requests) it seems that differentiation between the two concepts is necessary and request analysis is transferred to the designing time.

The responding system should be able to respond to the strict requests. That is first, the time of request analysis should be acceptable for the type of requests existing in the system. (The entity of analyzer of the request that analyzes the strict requests needs long time for analysis. The time is a direct function from the factors of causality-reasonability-time and place spaces and also the way of creating the request in the system).

Second, the system should be able to create the Full Transparency concept for the requesting element. Lack of involvement of requesting element in the responding trend means that the system should have the ability of analyzing the trend of responding to request and be able to face the request by changing the request concept (Or changing the request entity) during the responding time.

Such system implies that the system should be able to analyze both the need and the response to the need and on the basis of these two elements be able to decide for responding trend. Analyzing the trend of responding to the need is an affair that is dependent on its space however the response analysis affair is dependent on the results obtained from performing the operation of responding to need in system and what remained from the trend.

To realize the effects on the rest of a need by responding to a section of it and how it changes the entity of the remaining sections, is so complicated and expensive, so that designing such a system is acceptable only for the systems which their causality is limited to some factors. Analyzing the response to the need and its effects on its remaining parts, has a very complicated entity and requires time changes and transmission of place and time vectors at the time of performance which highly complicates the resource management element.

This is noteworthy that when the responding system wants to analyze the response, it should either have the remaining functional model of request in advance (that is the responding system knows what trend will be conducted by the request, so it can exploit the information by fixing the trend and consecutively executing the request. This is not usable in all-purpose systems) or the responding system should be able to transfer the place and time space of request without executing the program to the next place and time space on the basis of mathematical relations that describe the request's entity but this is so complicated and expensive.

With respect to complexity of such approach, incorporation of two concepts of request analyzer element and request's management element can execute both above concepts without the expenses of response analysis.

When these two concepts are incorporated, first the request analyzing element is activated against special events (or specific times) in system after executing the duties related to the need management element, to be able to analyze the remaining status of the request (That is considered as a new request) compared to the status of initial request and offers it as the new request to the request management element.

Second, the entity of request's analysis entity is Description-type, while the entity of request management is of executive type. Therefore, the architecture of resource management element should be able to support the two concepts above. The architecture of DNA PMamut performs such duty. If we consider one ring of DNA PMamut, the initial elements of the ring analyze the request entity (In terms of duty of the ring).

The units established in this section exploit and convert the request entity (Description entity) to the executive concepts of PMAMUT. These units analyze the request's entity (In terms of units duty). According to the fundamental concepts of PMAMUT's resource management element, the ending units of each ring are of the type of request's executive management units and their duty is to perform the activities related to ring's duty on the basis of what obtained from request's analysis units in the ring.

PMAMUT is an executable method and system both in computer implemented environment as well as life style changing theory applicable to all types of resource management framework.

The invention as explained here, is carried out on a processing machine such as a computer or any processing means able to perform all the concepts of the theory and method steps described earlier in order to generate all the necessary response structures as well as answering all task assignments.

This executable program can be designed for any system comprising a management framework with a new cognitive pattern.

This invention comprises computer readable medium comprising codes necessary for performing methods and steps to run a flexible and run-time resource management framework (PMamut) in a scalable and openness distributed system, wherein said system provides a specific architecture consistent based on nature of any request created in said system's predefined response structure; wherein said run-time management framework comprises activities needed in response to any of said requests at run time and wherein said activities are based on derived properties from said nature of any of said requests; wherein a new cognitive pattern and task assignment is provided in said system based on extending reductionist thinking and system thinking, wherein none of elements of said system is forced to follow rules based on their response structure.

The specific architecture comprises a DNA structure, created per any of said requests, wherein said DNA provides an opportunity to any user that utilizes a uniform structure to respond to all types of said requests; and further said DNA comprises a self-tuning feature.

The run-time management framework uses uniform structures in managing all types of resources in said system.

The run-time management framework comprises a two level resource management structure, separating two concepts of decision making and execution in managing said all types of requests; utilized per any of said activities needed in response to any of said requests.

The specific architecture is flexible in responding to said requests with dynamic and interactive nature and wherein said DNA self-tunes said structure of said response per each new said all types of requests.

The run-time management framework provides said run-time response structure based on an extended supply-demand theory in economics, wherein each of said run-time response structure elects a leader in each of said supplied-state based on an election rule of said system; wherein said response structure is request oriented and manages requests based on said DNA and wherein said response structure is constructed based on said supplied-state.

The supplied-state is created based on said extended supply concept with squared correlation coefficient and wherein said run-time response structure has an ability to form for first time at said run time.

The supplied-state comprises any type of computing systems, wherein said extended supply concept is flexible and utilizes a uniform model for management of all types of resources in said system.

The run-time management framework, elects a leader inside each of said supply-states based on nature of said supply-state, resources and requests.

The response structure eliminates need for server machines, and wherein each of said leader is responsible for increasing an efficiency of said supplied-state, and also prevents any abnormalities of supply function based on said economic theory.

The response structure includes a controlling system named Completed Global Activity, based on said extended supply concept in micro-macroeconomics, controlling distributed operations of said system, without using servers.

The response structure is scalable and further utilizes a successor concept at said run time which increases said flexibility and scalability and prevents any set/hold back in any of said response process of said system in responding to any of said requests with dynamic and interactive nature.

The run-time management framework further presents federal rules, supporting local autonomy based on a causality and mission of said system and each of said elements of said system, such as machines and/or said supplied-state; and wherein said run-time management framework further guarantees said efficiency of said system based on any of Market economy theory.

The machines uses a buyer-seller theory and a difference between two population means to estimate said machine state to make decision for participating in any of said global activity for supporting said local autonomy.

The description of said machine state is done by a four dimensional model based on said Latin square design on said completed global activity that is obtained from extending said approach used in said server based system.

The method and system described above is not limited to personal computer readable mediums and is executable on any means for processing small and large scale management frameworks, such a small home/office environment to a more global and universal environment. Therefore it is obvious that based on the demands for execution of such small or large systems, the complexity and intellectual aspect of such processing unit as well as computer codes needed to run such system can be varied for each framework.

The invention claimed is:

1. A Runtime flexible resource management framework in scalable and openness distributed system comprising a non-transitory computer readable medium including computer implemented software for said flexible and run-time resource management framework (PMamut) in said scalable and openness distributed system, wherein said system provides a specific architecture consistent based on nature of any request created in said system's predefined response structure; wherein said run-time management framework comprises activities needed in response to any of said requests at run time and wherein said activities are based on derived properties from said nature of any of said requests; wherein a new cognitive pattern and task assignment is provided in said system based on extending reductionist thinking and system thinking, wherein none of elements of said system is forced to follow rules based on their response structure; wherein said run-time management framework comprises a two level resource management structure, separating two concepts of decision making and execution in managing all types of said requests; utilized per any of said activities needed in response to any of said requests.

2. The system of claim 1, wherein said specific architecture comprises a DNA-shaped structure, created per any of said requests, wherein said DNA provides an opportunity to any user that utilizes a uniform structure to respond to said all types of said requests; and further said DNA comprises a self-tuning feature.

3. The system of claim 2, wherein said run-time management framework uses uniform structures in managing all types of resources in said system.

4. The system of claim 2, wherein said specific architecture is flexible in responding to said requests with dynamic and interactive nature and wherein said DNA self-tunes said structure of said response per each new said all types of requests.

5. The system of claim 3, wherein said run-time management framework provides a run-time response structure based on an extended supply-demand theory in economics, wherein each of said run-time response structure elects a leader from a supplied-state having flexibility in changing management rules based on an election rule of said system; wherein said response structure is request oriented and manages requests based on said DNA and wherein said response structure is constructed based on said supplied-state.

6. The system of claim 5, wherein said supplied-state is created based on an extended supply concept with squared correlation coefficient and wherein said run-time response structure has an ability to form for first time at said run time.

7. The system of claim 6, wherein said supplied-state comprises any type of computing systems, wherein said extended supply concept is flexible and utilizes a uniform model for management of said all types of resources in said system.

8. The system of claim 7, wherein said run-time management framework, elects said leader inside each of said supply-states based on nature of said supply-state, resources and requests.

9. The system of claim 8, wherein said response structure eliminates a need for server machines, and wherein each of said leader is responsible for increasing an efficiency of said supplied-state, and also prevents any abnormalities of supply function based on said supply-demand economic theory.

10. The system of claim 9, wherein said response structure includes a controlling system named Completed Global Activity, based on said extended supply concept in micro-macroeconomics, controlling distributed operations of said system, without using servers.

11. The system of claim 10, wherein said response structure is scalable and further utilizes a successor concept at said run time which increases said flexibility and scalability and prevents any set/hold back in any of response processes of said system in responding to any of said requests with dynamic and interactive nature.

12. The system of claim 11, wherein said run-time management framework further presents federal rules, supporting local autonomy based on a causality and mission of said system and each of said elements of said system, machines and/or said supplied-state; and wherein said run-time management framework further guarantees an efficiency of said system based on any of Market economy theory.

13. The system of claim 12, wherein each of said machines uses a buyer-seller theory and a difference between two populations means to estimate said machine state to make decision for participating in any of said global activity for supporting a local autonomy.

14. The system of claim 13, wherein description of said machine state is done by a four dimensional model based on a Latin square design on said completed global activity that is obtained from extending said approach used in a server based system.

15. A method and steps of processing and controlling a runtime flexible resource management framework (PMamut) in scalable and openness distributed system; comprising steps of providing a specific architecture consistent based on nature of any request created in said system's predefined response structure; wherein said run-time management framework comprises activities needed in response to any of said requests at said run time and wherein said activities are based on derived properties from said nature of any of said requests; wherein a new cognitive pattern and task assignment is provided in said system based on extending reductionist thinking and system thinking, wherein none of elements of said system is forced to follow rules based on their said response structure; wherein said run-time management framework comprises step of processing a two level resource management structure, separating two concepts of decision making and execution in managing all types of requests; utilized per any of said activities needed in response to any of said requests.

16. The method of claim 15, wherein said specific architecture comprises step of generating a DNA-shaped structure, created per any of said requests, wherein said DNA provides an opportunity to any user that utilizes a uniform structure to respond to said all types of said requests; and further said DNA comprises a self-tuning feature.

17. The method of claim 16, wherein said run-time management framework uses uniform structures in managing all types of resources in said system.

18. The method of claim 16, wherein said specific architecture is flexible in responding to said requests with dynamic and interactive nature and wherein said DNA self-tunes said structure of said response per each new said all types of requests.

19. The method of claim 17, wherein said run-time management framework provides a run-time response structure based on an extended supply-demand theory in economics, wherein each of said run-time response structure comprises a step of electing a leader in a supplied-state based on an election rule of said system; wherein said response structure is request oriented and manages requests based on said DNA and wherein said response structure is constructed based on said supplied-state.

20. The method of claim 19, wherein said supplied-state is created based on said extended supply-demand concept with squared correlation coefficient and wherein said run-time response structure has an ability to form for first time at said run time.

21. The method of claim 20, wherein said supplied-state comprises any type of computing systems, wherein said extended supply-demand concept is flexible and utilizes a uniform model for management of said all types of resources in said system.

22. The method of claim 21, wherein said run-time management framework, comprises a step of electing said leader inside each of said supply-states based on nature of said supply-state, resources and requests.

23. The method of claim 22, wherein said response structure eliminates need for server machines, and wherein each of said leader are responsible for increasing an efficiency of said supplied-state, and also prevents any abnormalities of supply function based on an economic theory.

24. The method of claim 23, wherein said response structure includes a step of controlling a Completed Global Activity system, based on said extended supply-demand concept in micro-macroeconomics, controlling distributed operations of said system, without using servers.

25. The method of claim 24, wherein said response structure is scalable and further utilizes a successor concept at said run time which increases said flexibility and scalability and prevents any set/hold back in any of said response process of said system in responding to any of said requests with dynamic and interactive nature.

26. The method of claim 25, wherein said run-time management framework step further presents a step for federal rules, supporting local autonomy based on a causality and mission of said system and each elements of said system, machines and/or said supplied-state; and wherein said run-time management framework further guarantees efficiency of said system based on any of Market economy theory.

27. The method of claim 26, wherein each of said machines uses a buyer-seller theory and a difference between two populations means to estimate said machine state to make decision for participating in any of said global activity for supporting said local autonomy.

28. The method of claim 27, wherein description of said machine state is done by a four dimensional model based on a Latin square design on said completed global activity that is obtained from extending said approach used in a server based system.

* * * * *